United States Patent
Shutt et al.

(10) Patent No.: US 6,169,993 B1
(45) Date of Patent: *Jan. 2, 2001

(54) METHOD, DATA STRUCTURE, AND COMPUTER PROGRAM PRODUCT FOR OBJECT STATE STORAGE

(75) Inventors: David R. Shutt; Steven M. Cellini, both of Seattle, WA (US)

(73) Assignee: Microsoft Corporation, Redmond, WA (US)

( * ) Notice: Under 35 U.S.C. 154(b), the term of this patent shall be extended for 0 days.

This patent is subject to a terminal disclaimer.

(21) Appl. No.: 09/272,110

(22) Filed: Mar. 19, 1999

Related U.S. Application Data

(63) Continuation of application No. 08/822,450, filed on Mar. 19, 1997, now Pat. No. 5,905,987.

(51) Int. Cl.[7] .................................................. G06F 17/30
(52) U.S. Cl. ........................................... 707/103; 707/102
(58) Field of Search .................................. 707/103, 102, 707/101, 202, 203

(56) References Cited

U.S. PATENT DOCUMENTS

| | | | |
|---|---|---|---|
| 5,247,669 | 9/1993 | Abraham et al. | 395/600 |
| 5,291,593 | 3/1994 | Abraham et al. | 395/600 |
| 5,613,099 | 3/1997 | Erickson et al. | 395/500 |
| 5,692,183 | 11/1997 | Hapner et al. | 395/614 |
| 5,729,739 | 3/1998 | Cantin et al. | 395/614 |
| 5,905,987 | * 5/1999 | Shutt et al. | 707/103 |

* cited by examiner

*Primary Examiner*—Paul V. Kulik
(74) *Attorney, Agent, or Firm*—Workman, Nydegger, Seeley

(57) ABSTRACT

In an interface-based binary object system capable of supporting multiple interfaces into objects created by class templates, a repository of stored object states is formed that can be accessed by later created objects. Such later created objects may be of the same class as the original object or may be of a new class extended from the original class and still use the same stored object state. Access to the stored object state is made through a generic repository object that emulates the behavior of a particular class of object as defined in type definitions. Requests to a particular object's properties through interface methods are serviced by having the generic repository object make reference to the type definitions in order to fulfill the request. Binary extensibility of the generic repository object along with proper class definition in the type definitions allows custom objects having greater functionality than that provided by the generic repository object to be implemented. Furthermore, class definitions that use only functionality provided by the generic repository object may be defined so as to allow instantiation of objects without the implementation of actual software code whatsoever. Finally, in a currently preferred embodiment, object state is stored advantageously in SQL database tables organized on a per-interface basis with properties common to all objects stored in a main stored object state table.

24 Claims, 21 Drawing Sheets

| REPOSITORY OBJECT STATE TABLE ||||| 
|---|---|---|---|---|
| Object ID | Type | Time Last Update | ... | |
| 0 | Root | | | |
| 1 | ReposTypLib (Personal Info Manager) | | | |
| 2 | ClassDef (CContact) | | | |
| 3 | InterfaceDef (IContact) | | | |
| 4 | PropertyDef (Name) | | | |
| 5 | PropertyDef (Phone) | | | |
| 6 | PropertyDef (E-mail) | | | |
| 7 | CollectionDef (AddressBooks) | | | |
| 8 | RelationshipDef (Contains) | | | |
| 9 | ClassDef (CAddressBook) | | | |
| 10 | InterfaceDef (IAddressBook) | | | |
| 11 | PropertyDef (Title) | | | |
| 12 | CollectionDef (Contacts) | | | |
| 13 | RepositoryObject: AddressBook | | | |
| 14 | RepositoryObject: AddressBook | | | |
| 15 | RepositoryObject: Contact | | | |
| 16 | RepositoryObject: Contact | | | |
| 17 | RepositoryObject: Contact | | | |
| 18 | RepositoryObject: Contact | | | |
| 19 | RepositoryObject: Contact | | | |

| ICONTACT INTERFACE TABLE | | | | ⟵ 324 |
|---|---|---|---|---|
| Object ID | Name | Phone | E-Mail | |
| 16 | Mindy | 111-1111 | Minz@home.com | |
| 17 | Amy | 222-2222 | Amy@SW.com | |
| 18 | Suzanne | 333-3333 | Suzanne@lib.edu | |
| 19 | Tobi | 444-4444 | Tobi@work.com | |
| 20 | Dave | 555-5555 | Dave@BS.com | |
| 328 | 330 | 332 | 334 | |

| IADDRESS BOOK INTERFACE TABLE | | ⟵ 326 |
|---|---|---|
| Object ID | Title | |
| 14 | Friends | |
| 15 | Attorneys | |
| 336 | 338 | |

FIG. 11B

| RELATIONSHIP TABLE | | | |
|---|---|---|---|
| Origin Object ID | Relationship Type | Destination Object ID | Name |
| 0 | IsContextFor | 1 | |
| 1 | IsScopeFor | 2 | |
| 1 | IsScopeFor | 3 | |
| 1 | IsScopeFor | 8 | |
| 1 | IsScopeFor | 9 | |
| 1 | IsScopeFor | 10 | |
| 2 | Implements | 3 | |
| 9 | Implements | 10 | |
| 3 | HasMembers | 4 | |
| 3 | HasMembers | 5 | |
| 3 | HasMembers | 6 | |
| 3 | HasMembers | 7 | |
| 10 | HasMembers | 11 | |
| 10 | HasMembers | 12 | |
| 7 | HasItem | 8 | |
| 12 | HasItem | 8 | |
| 13 | Contains | 15 | |
| 13 | Contains | 16 | |
| 13 | Contains | 17 | |
| 13 | Contains | 18 | |
| 14 | Contains | 17 | |
| 14 | Contains | 19 | |

FIG. 11C

METHOD, DATA STRUCTURE, AND COMPUTER PROGRAM PRODUCT FOR OBJECT STATE STORAGE

RELATED APPLICATIONS

This is a continuation of U.S. patent application Ser. No. 08/822,450, entitled "Method, Data Structure, and Computer Program Product for Object State Storage in a Repository," filed Mar. 19, 1997 now U.S. Pat. No. 5,905,987, which is hereby incorporated by reference.

BACKGROUND OF THE INVENTION

1. The Field of the Invention

The field of this invention is database storage software that preserves the state of software objects for later use by the creating program or some other client. More particularly, the present invention is related to such object persistence databases that have extensibility characteristics to facilitate implementation of custom objects.

2. Present State of the Art

With the advent of object-oriented design techniques, many changes have occurred in the software industry. These techniques have influenced virtually every aspect of application development and implementation and currently many different object oriented products and tools exist. This runs the gamut from languages supporting the creation of objects such as C++, to system level mechanisms allowing availability of objects registered thereto, to the operating system itself, and to any and all applications or other clients desiring to access such.

Many times, it is desirable to store an object's state as it is found in an active object so that another active object may be created at a later point in time long after the original active object has been destroyed. Thus, an application may instantiate a number of objects, operate on those objects to access and modify their state, save or persist the object's state in a more permanent storage such as a disk drive, and terminate execution. When the user desires to commence the application program at a later time, the particular stored state may be recalled and placed into newly instantiated objects so that the application may operate on the objects as they were originally stored. Furthermore, a different application or other client may recreate active objects from the persistent store thus allowing the capability and state of the persisted objects to be shared across different program entities.

As mentioned, having a database or repository of such persisted object states allows different clients (i.e., application programs, other objects, other software components) access to such objects so that they may be shared. By placing a high degree of functionality into the objects themselves, much of the development effort is centralized around object design and implementation so as to allow a decreasing amount of effort to be focused in the actual application development, reduce unnecessary duplication of effort, and avoid inconsistent interpretations of and updates to the object state by different applications.

For example, in a software development environment different software tools are used in the process of designing and creating a particular application program. Such tools, however, are related in that they may operate on the same types of information. A compiler and a source code analysis tool will both operate on application source code files and have overlap in certain behaviors for opening and parsing such files. By placing such behavior in a common software object, duplication of effort is eliminated, the individual application development time reduced, and the tools are assured of having the same interpretation of the source code files.

In a multi-client environment, with each client accessing the same repository of persistently stored object states, a number of problems arise that make it difficult to implement a general purpose common repository. For example, each different application may have application-specific requirements which will necessitate extending the description of the object state in the repository. For this reason, it is advantageous to allow extension of objects that have the object state persistence characteristics.

Extensibility also allows the use of a general object-oriented persistence implementation. In other words, an object may be based through inheritance or other extension mechanism on another object that has the object state persistence characteristics the inherited object needs. In this manner, a general object persistence functionality may be implemented a single time and the system mechanisms for extensibility can be used to propagate such functionality to other custom objects. There are different underlying object systems upon which to base an object-oriented object state repository that each have different configuration and extensibility mechanisms.

While class inheritance can be used in a compiled language environment to propagate the persistence characteristics to other more specific objects, a language inheritance mechanism for implementing such inheritance requires publication of the source code as well as an added compilation step. This occurs because language inheritance is implemented by a source code compiler which has an inherent need to use the source code of the underlying object state implementation in order to make that implementation available to the more specific object. The above is an example of a language based object system with a language extensibility model.

A binary based or executable code object system will overcome part of this problem and allow objects created by different source code implementations to coexist. Ideally, a binary based object system should allow some form of binary extensibility thereby allowing only an operational specification of the object to suffice in accessing and extending capabilities. In practice, however, many systems require that the extension of the object require client understanding of all underlying object functionality and changes therein to add state persistence can require a class to expose its proprietary source code to the extending class, which is undesirable for the developers of the class being extended.

An interface-based object system that supports multiple interfaces allows incremental extension without access to source code being extended as long as the interfaces used by the client operate the same on a binary level. State persistence functionality may be added easily and can provide greater functionality and extensibility to custom objects.

It is also advantageous to access an existing stored object state through an object that has greater functionality than the object whose state was originally stored. When this can be accomplished, a more dynamic development environment results wherein simultaneous development between different parts using the same object repository can occur.

SUMMARY AND OBJECTS OF THE INVENTION

It is an object of the present invention to provide permanent storage of a software object state in a database so that an object may be recreated at a later time having the stored state used therein.

It is another object of the present invention to place object persistence capabilities on interfaces rather than class templates so as to facilitate expanded extensibility.

Another object of the present invention is to allow easy extensibility of the persistent capabilities to custom objects so that object persistence capability is readily available to custom objects.

Yet another object of the present invention is to provide interface-based persistence capabilities that can be incorporated with other custom interfaces to form unique software objects having object state persistence.

It is an object of the present invention to allow custom behavior to be added to the inherent capabilities of the those provided in an object repository engine.

It is an object of the present invention to provide a mechanism for adding additional behavior to objects previously persisted so that the reloaded objects will have more behavior characteristics than when originally persisted.

It is yet another object of the present invention to allow creation of objects based on a newly defined class without providing additional executable code.

It is an object of the present invention to endow a generic repository object the ability to emulate a certain object type.

It is another object of the present invention to provide type definition information that can be accessed by a generic repository object in order to emulate another object's behavior.

It is a further object of this invention to map object state data in a database on a per-interface basis.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a method, data structure, and computer program product for object state storage in a repository is provided.

The present invention exists in an environment or object system that is interface-based and supports binary extensibility. Essentially, objects are only known through their interfaces with the interfaces specifying properties and methods to operate on such properties. Furthermore, such interfaces have a binary access definition through a binary convention that make any language specific implementation details unimportant as long as a functional understanding exists regarding the particular interface in question. Because of this binary access feature, objects can be extended using binary extension methods requiring only a minimum of information for such extension.

The database capability for storing any particular object's state (i.e., the property values associated with all the interfaces that make up the object) is available through one or more interfaces supported by the object. These object persistence interfaces can be extended upon using the normal binary extension capabilities of the extensible object system so that custom objects may incorporate them and thereby have persistence in a database. New interface properties may be added to the repository of stored object state information by defining them to the repository through a type definition model.

The present invention overcomes the limitation of requiring source code specifications on classes incorporating the database functionality by defining the database behavior on one or more interfaces supported by the persisted object rather than the class used to create the persisted object. By having a definition of the class of the object (i.e. new specification of the composition of the object), and assuring that the object supports the interfaces for database or persistence capability (in addition to all the custom interfaces needed to provide the object's purpose), the object thus instantiated inherently has the ability to persist itself into the database.

To add new object types to the repository, the system designer will add the class definition that describes the object into a repository type definition library to give the repository knowledge of the storage requirements for the new object type. The user will then provide a COM server (i.e., a DLL file) to implement the interfaces and interface methods that cannot be implemented by the repository engine. Finally, the new class is made available to the binary object system so that clients may be able to instantiate objects of that class.

Because of the binary extension capabilities of the interface-based extensible object system and having the persistence capabilities defined on interfaces incorporated in an object, the persisted object state may be accessed by a new class having new functionality added thereto by simply defining the class incorporating the added functionality to the repository system.

A generic repository object is implemented that emulates the behavior of an object defined in a repository type definition. Current repository behavior available from the generic repository object currently includes emulation of interface methods for accessing and setting property values, allocating storage for properties, and implementing relationships between interfaces to facilitate navigation of a repository. Optionally, other behavior may yet be implemented according to desire.

The generic repository object can access the previously stored type information for classes that rely solely on the repository behavior inherent therein to instantiate objects of that class, without requiring new code to be written. The generic repository object will not know the class type for creating the new object until execution time and hence binds interactively to the type definitions to interpret the class type so that it may allocate storage and behave appropriately.

This generic repository object may be "wrapped" or extended upon according to the underlying object system. By making a custom object based upon the generic repository object, supplying new code for methods not inherently supported by the generic repository object, and making the necessary type definition entries to the repository, the custom object will automatically have its state persisted into the database.

The present invention avoids inefficiencies by creating a repository for storing object state in which mapping is done by forming two types of tables. One type of table is a main object state table wherein the rows identify each stored object state and the columns identify one or more properties common to all stored object states. The other type of table is an interface table wherein the rows identify state for objects while the columns identify the properties of each supported interface. Properties, by definition, are associated with a particular interface because they can only be accessed by an interface "get" or "set" method.

A presently preferred embodiment of the present invention uses an SQL database. By so organizing or mapping the property data values according to interface, the properties associated with an interface are stored contiguously allowing them to be retrieved efficiently. Also, a single SQL query may acquire a result set of property values on a given interface for all objects supporting that interface. Further, this SQL database may be accessed directly or through the repository.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1A shows a plurality of classes for use as templates to create instantiated objects with each class implementing or supporting one or more interfaces. FIG. 1B shows a client that is accessing, or interacting with three objects created by the classes in FIG. 1A through the defined interfaces.

FIGS. 11A, 11B, and 11C are a drawing of the tables necessary along with the corresponding values found therein for persisting the state of the objects used in representing the address book and the contact example shown in FIG. 6 and having the type information object hierarchy of FIG. 5.

FIGS. 14A, 14B, and 14C together form a flow chart showing a possible search algorithm and how navigation of the object state repository would occur in order to find and process a given contact as found in a particular address book. Such a searching process would possibly be found in the browser shown in FIG. 13.

DETAILED DESCRIPTION OF THE PREFERRED EMBODIMENTS

Figure 1B:
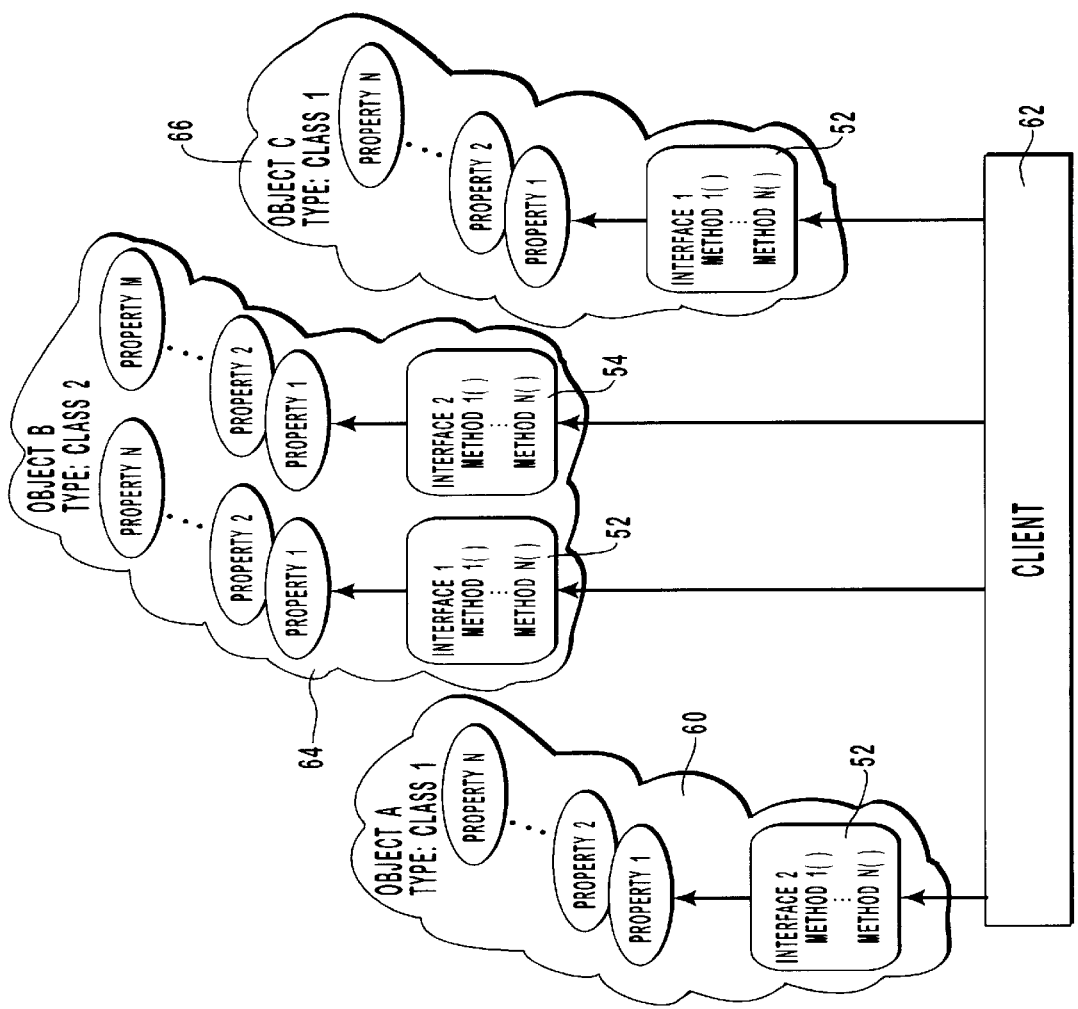
FIGS. 1A and 1B are logical diagrams showing the relationship between classes, interfaces, properties, objects, and clients. More particularly.

A. Terminology and Interface Based Object Model with Binary Extensibility

Throughout this application, reference will be made to objects that are created or instantiated by computer software. Such objects will have a data portion associated therewith for storing information, and have methods or functionality associated therewith to provide desired functionality to a client accessing the object. Typically, the methods of the object will be directed in part to manipulating the object's data. Such an abstract object has an associated state that is the cumulative effect of methods operating on the data. It is this state that will be stored by the innovative object state repository as explained in this application.

"Objects," as used throughout this application will refer to objects pertaining to a binary object model and that have binary extensibility through wrapping. Furthermore, such objects are interface-based meaning that an object is only used or operated through specific "interfaces" as defined hereafter and an interface-based binary object model will entail objects having multiple interfaces. In this sense, an object is only known through its interfaces and there is no specific reference to an object in its entirety.

An object may be active or loaded meaning that it is a functional part of a software program or system. An object is said to be persisted when the data portion or properties are stored, though it is more accurate to refer to the state of an object as being persisted. At a later time, an object of the same class may be instantiated and restored to the same state as the original object using the previously persisted object state.

As used herein, the term "binary extensibility" or "wrapping" refers to creating new object classes based on existing object classes regardless of the software code used to implement the various interfaces that make up a particular existing class. The extension model will expect interface functionality to be accessible through a binary convention regardless of actual source code used to arrive at the executable code. A "wrapped" object may use all or only some of the interface functionality implemented in a built-upon class, and some of the behavior of the built-upon class may be passed through to the clients of the wrapped object without the wrapped object knowing the nature of or even the existence of the behavior to be passed through.

One implementation of a binary object model and system that follows the characteristics of objects used throughout this application and as described above is the Component Object Model or COM as provided by Microsoft® Corporation as part of their Object Linking and Embedding (OLE) and ActiveX™ software technology. Reference to COM objects will be made as part of a specific and exemplary embodiment of the present invention. The invention, however, would fit any object model having the relevant characteristics of COM, namely, being an interface-based, binary object model supporting binary extensibility.

An "interface" as used herein is a specification for a particular and related subgroup of behavior and properties. Behavior or methods are typically a set of software subroutines, with each subroutine having a signature made up of the passed subroutine arguments, their order, and their data type. Further, each interface will have data associated therewith in the form of properties that are only accessible through a subroutine of the interface. Finally, an object may support multiple interfaces to thereby allow an object's characteristics to be defined by the interfaces that it supports and allow many classes to share behavior by supporting some of the same interfaces.

An interface, as part of the binary object system, also specifies a binary convention for accessing the software subroutines that support or implement the interface. Knowing the binary convention, the subroutine signatures that are defined by the interface, and a functional specification of how the subroutines are to behave, an object implementing a particular interface may be created using virtually any source code. Each such independently created object would be wholly unique and may represent internal data in a variety of different structures but from a binary standpoint would appear the same to an invoking client. Likewise, once an interface has been implemented and reduced to its binary form, any client may access the methods through the binary convention.

As found herein, the term "class" refers to a definition for directing a CPU to create an instance of an object. A class, therefore, will implement the interfaces that make up a given object and therefore is a template for creating objects. A class may be a source code definition that is compiled into executable code that will create run-time storage for the properties of an object and executable code to support the interface methods.

As used herein, a "property" is defined to mean a piece of data associated with an object. Further, the property may only be accessed through the appropriate interface method (e.g., subroutine). For example, for purposes of the presently preferred embodiment a "get" property subroutine and "put" property subroutine are implemented for retrieving and storing values for a particular property, respectively.

As used herein, the term "collection" refers to a special variant for a kind of property. More specifically, it is a set-valued property meaning that multiple items are formed into a collection. An item includes, but is not limited to, scalar values, such as integers, strings, etc., or may be an object (e.g., a handle to an interface of an object). Each collection will support methods for adding or removing a an item as well as finding a particular item within the set and returning a count of how many items are in a set.

Throughout this application, when dealing with specific classes, a "C" will precede the class name so as to identify the name as that of a class. In like manner, an "I" will precede an interface name so as to identify name as that of an interface. For example an object representing a square and having an interface to allow drawing of the square would be created by the CSquare class and would implement an interface IDraw that would include a method draw or draw( ).

Figure 1A:
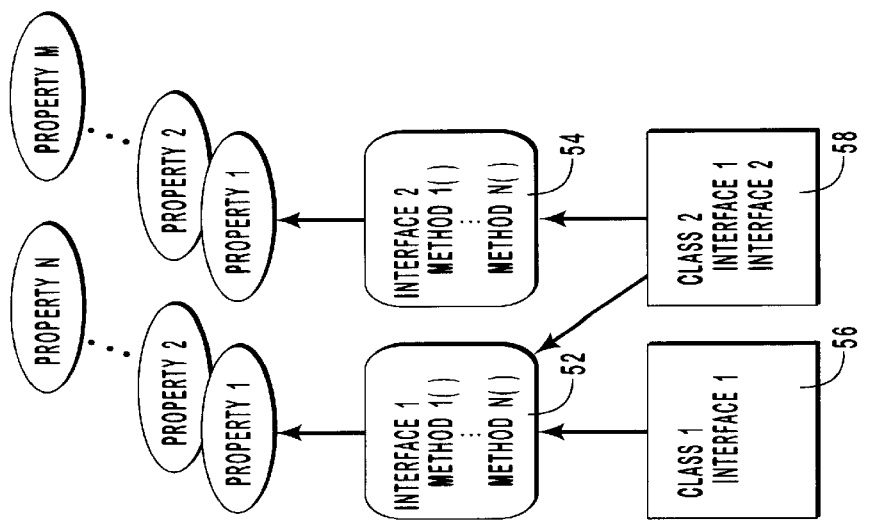

FIG. 1A is a logical diagram showing the relationship between classes and interfaces. A plurality of interfaces exist as specifications for operating on an object, accessing particular properties as explained previously, and accessing the object's other behavior, such as methods. Interface 52 supports a number of methods and has a number of properties, while interface 54 also supports a number of methods (different than those of interface 52) and a number of properties (again, different from those of interface 52). Interfaces are defined as necessary by designers of particular software programs to encapsulate a related set of functionality.

Class 56 is a template for creating objects having interface 52. Likewise, class 58 is a template for creating objects that have both interface 52 and interface 54. Thus we can see that a particular interface may be defined by completely different templates or actual pieces of software code. For example, class 56 may be written in C++ while class 58 may be written in some other programming language. However, when objects are created by class 56 or class 58, respectively, any program knowing the appropriate binary convention associated with the supported interfaces and the operation of the supported interfaces will be able to manipulate the object thus created as desired or to wrap and extend the object.

FIG. 1B is a logical diagram showing how a particular client may operate upon the instantiated objects (represented in clouds) through the specified interfaces. Object 60, created from class 56, supports interface 52. Client 62 accesses or operates upon object 60 through interface 52 by invoking the methods according to the binary convention. A client may be an application program, another object, or any other software entity. Object 64, created by class 58, supports both interface 52 and interface 54 giving client 62 access to the respective methods and properties through either or both interfaces. Finally, object 66 is another instance of class 56 and supports interface 52. Because each instantiation has its own data space, object 60 and object 66, though created from the same class 56 and supporting the same interface 52, will have different object states depending on how client 62 accesses and operates on the respective object through the interfaces.

It is important to recognize that an object, according to the present invention, is known to a client by its interfaces. Typically, on the tangible level, an interface will be accessed by a pointer, handle or other identifier that can be used by the client to eventually access the executable software through the binary convention established as part of the binary object system.

One example of the binary object system that is interface-based as explained above is the COM system by Microsoft. Each object according to the COM system must support a particular interface by definition. This interface, IUnknown, has a QueryInterface method that allows a client to inquire whether other interfaces are supported by the object by passing a globally unique identifier (GUID), called the interface identifier, that uniquely identifies the interface. If so supported, a pointer or reference to the interface is returned and the client may then access the functionality through COM's binary convention. Thus, IUnknown is an indicating interface that will lead to other interfaces supported by an object.

Object functionality may grow by adding new interfaces to an object that more advanced clients can access without harming the operation of older clients who are unaware of the new interfaces through the indicating interface IUnknown. The COM object system allows registered objects to be redirected to new executable code for instantiation by a client through a "treat as" statement in the system registry. This will cause the system to use the "server" indicated for the new class following the "treat as" statement. (A "server" is binary executable code that implements a class.) While this mechanism is generally used for versioning to allow old object classes to be mixed with the newer versions and additional classes found in newly installed software, the repository engine makes use of the "treat as" statement to create a single generic repository object that will emulate the interfaces of an object class defined to the repository engine in the type definition model as will be explained in more detail hereafter.

The binary convention in the COM object system for accessing the interface method is a reference to an interface's data area wherein the interface property values are stored in an implementation-specific format not normally known by the client. The first value of that data area, by definition, is another reference or pointer to a table of pointers known as a VTable. Each entry in the VTable is a pointer to a loaded executable code function that makes up one of the interface methods. In this manner, a client, given an interface pointer and a description of the interface may quickly find the correct subroutine to execute as desired. More details as to the details and way that COM is able to achieve binary extensibility and the binary linkage at the interface level may be found in COM specification documents.

For purposes of this disclosure and patent application, any general object-based system having such binary extensibility capabilities and being interface-based as explained previously will suffice as an underlying object system for implanting the present invention. A working knowledge of COM and OLE is presumed for purposes of understanding the implementation details of the currently preferred embodiment as explained hereafter. The COM/OLE technology is widely accepted in the computer industry and those skilled in the art will recognize application of the present invention to other similar object systems.

B. System Architecture within Relevant Environment

Figure 2:
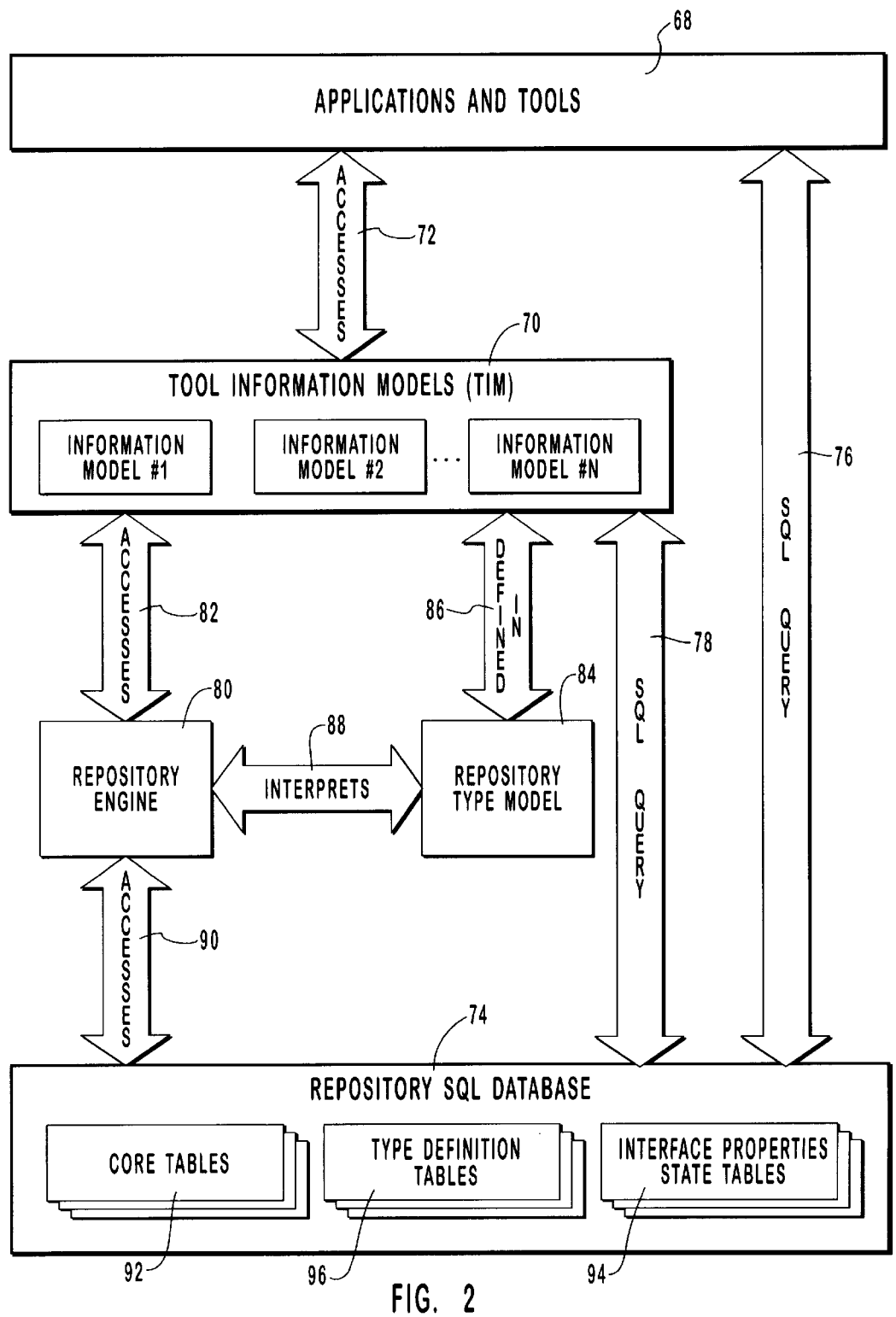
FIG. 2 is an architectural diagram showing the constituent pieces of a system using a repository according to the present invention. More particularly, applications, tools and other clients will access a tool information object model that is built upon objects accessing the repository functionality with the repository engine storing object state in a SQL database.

FIG. 2 shows an architectural diagram of a repository according to the present invention. In a typical environment, clients 68 consisting of applications, software tools, objects, and other software entities, will access one of a plurality of tool information models 70 as represented by arrow 72. Each tool information model consists of a set of type and class definitions. Furthermore, the clients may directly access the repository SQL database 74 as represented by arrow 76. This direct access ability provides greater client flexibility since complex SQL queries may be developed to generate specific types of information or acquire stored object state IDs. While a client reading the SQL database 74 may present little harm, writing the SQL database should be done carefully since the main repository engine will also be accessing and maintaining the same database.

Each information model within the plurality of information models 70 will consist of classes and object hierarchies based upon or extended from repository objects. In some instances, clients may access the tool information model objects without concern as to implementation details underneath for a particular object's state persistence, which depends on the particular tool information model design. Furthermore, the tool information model objects may also be implemented so as to access the repository SQL database 74 directly as represented by arrow 78. This direct accessibility may be used to rapidly search for persisted object state for loading into instantiated object "shells" in order to recreate the object at its state prior to persistence.

Each tool information model within the plurality of tool information models 70 will access the repository engine 80 as represented by arrow 82 as well as defining the object hierarchy and object definitions in terms of properties, interfaces and classes in the repository type definition model 84 as represented by arrow 86.

The repository engine 80 is accessed by a client through an API that will instantiate a COM object representing the entire repository. Methods on this initial repository instance object will allow opening of a particular database of stored object states and instantiating a root repository object (whose state will come from the database) from which the entire database may be navigated using interface methods to instantiate other objects having their state loaded from the database as previously stored values. The repository engine functionality is implemented in and accessed through COM repository objects as will be shown in greater detail hereafter.

For each item in the repository, a generic repository object represents such an object and interprets specific object behavior by reference to type definitions expressed in the repository type model 84 previously defined. A generic repository object, therefore, has a type associated with it to describe its functional characteristics. To the client, the generic repository object will be loaded, accessed, and appear as a standard COM object of the desired class because that class has been defined in the repository type model 84. Additionally, entries are made into the COM registry that identify the different object classes to the system. The "treat as" statement is also used to direct the system to create such objects using the common generic repository object that will give life to the object by dynamic interpretation or emulation based on the repository type model as represented by arrow 88. In the currently preferred embodiment, this type information is accessed and stored as repository objects while other implementations may store the information in a file.

The repository engine 80 including the API, root objects, and repository objects will access the repository SQL database 74 as represented by arrow 90 for storing object state, accessing type information, and otherwise managing the repository SQL database 74. The SQL database 74 may be any commercially available database and an SQL engine is preferred due to wide availability and ease of use. Those skilled in the art will see that virtually any database may be used and configured in conjunction with the present invention. For example, object oriented databases may be a suitable choice for some implementations.

The repository SQL database 74 has a number of tables that may be accessed by the repository engine 80, as well as be queried by one of a plurality of tool information models 70 or clients 68. First are the core tables 92 that assist in managing the entire database including a table for listing each and every object state persisted therein with all the common information necessary to maintain such a stored object state. Also, interface property state tables 94 exist for each type of interface supported within the repository. For each interface, the rows will indicate each stored object state that supports the interface while columns will indicate each value for the properties supported by the interface.

Although a mapping of each interface to a unique table is easy to implement, more complex mappings are possible and can be useful. For example, the properties of two or more interfaces can be mapped to the same table or a particular interface may be mapped to different tables for each class that supports the interface. The core tables 92 also include a table for relationships between interfaces as will be explained in more detail hereafter.

Object oriented databases are useful in many situations (e.g., complex engineering CAD/CAM applications) and could also be used as an alternative to standard relational databases. When using an object oriented database embodiment, an interface can be mapped to a class in the object oriented database. In such an embodiment, the generic repository object will use the object oriented search and retrieval paradigms to achieve the functionality explained herein.

The repository can also represent properties in an inverted format, which is useful for properties that occur relatively sparsely among the set of objects that support a given interface. In the actual SQL database tables, the annotational properties are stored in a single table and are identified by a stored object state ID, specific property ID, and property value. While there is some extra storage inherent in representing properties in this inverted format, this can be a more efficient form of storage overall due to the sparse use of the properties. None, some, or all of the properties on an interface can be designated as "inverted" for storage in the above-described inverted format. Furthermore, an object making use of the inverted format must also support a designated interface to have such capabilities.

Finally, the repository SQL database 74 contains type definition tables that store information relevant to the repository-type model 84. The type definition tables 96 may be used to load a live or active object hierarchy representing the repository type model 84 for use by the generic repository object during repository system use.

C. Repository Type Information and Tool Information Model (TIM)

Figure 3:
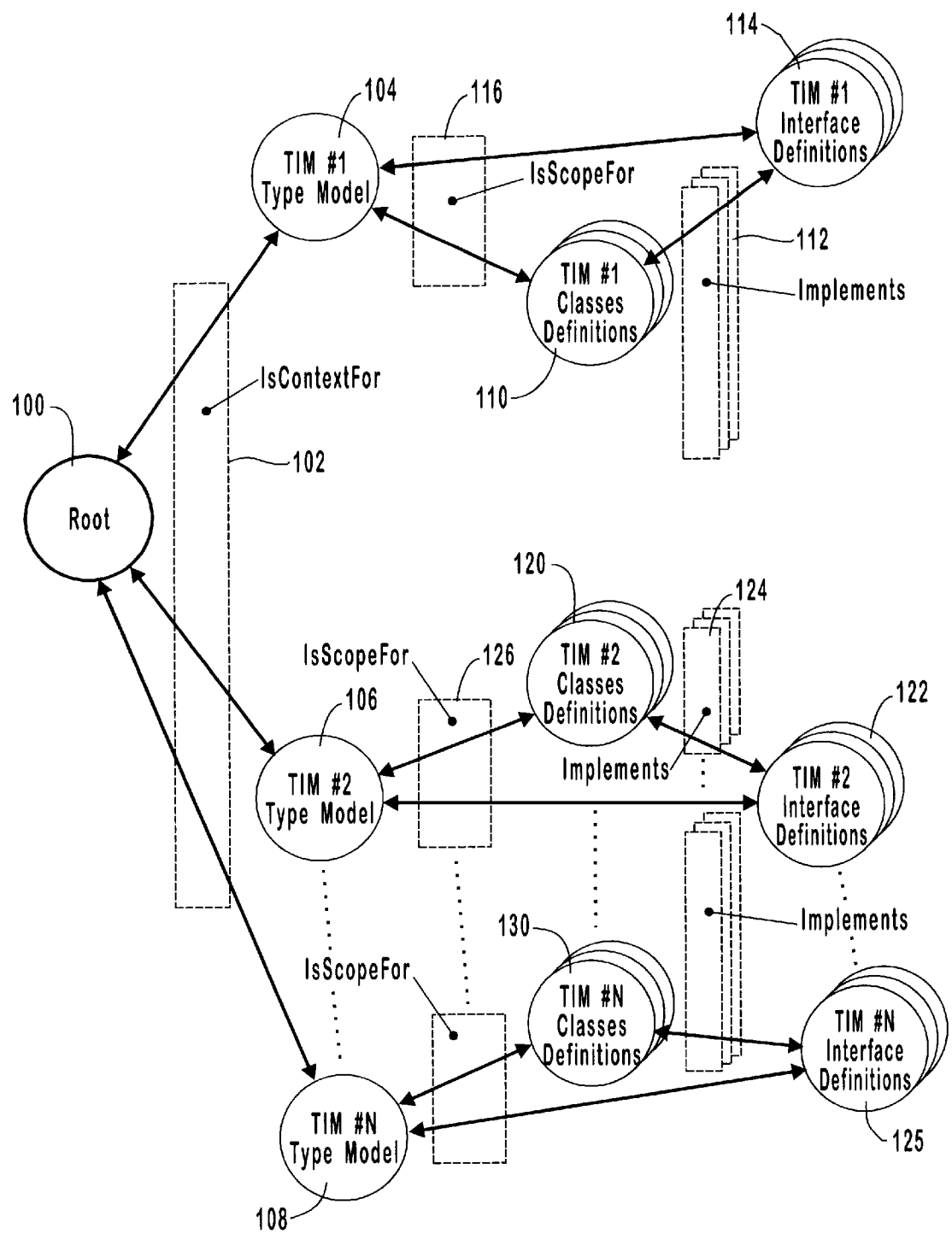
FIG. 3 shows a general object model of type information used to define to the repository the various classes and interfaces supported by such classes that make up a tool information model.

FIG. 3 is a logical object diagram illustrating how type information is stored by the repository engine for interpretation in a hierarchy of repository objects. Specifically, when a generic repository object is required to behave in a certain manner according to an object definition in a tool information model, this object hierarchy will be traversed in order to acquire the detailed information necessary to emulate such behavior. The object hierarchy shown in FIG. 3 are objects within the repository system and have their states stored in the SQL database. Instantiation of the objects will occur during use of interface methods on existing objects to allow traversal or navigation of the hierarchy. Those skilled in the art will see that all varieties of caching schemes may be implemented to assist in achieving higher performance levels. Furthermore, implicit in object navigation is the retrieval of a stored state from the database to be used in the newly instantiated object and all property manipulations or other state changing activities will be reflected and stored in the database so that the state is continually persisted.

From the root object 100 all of the repository type library objects representing the individual tool information model type definitions can be navigated through an IsContextFor relationship 102 represented by linear connections going through dashed box information. For example, repository type library object 104 corresponding to tool information model number 1, repository type library object 106 corresponding to tool information model number 2 and continuing on down to repository type library object 108 for tool information model number N are all available from the root object 100 through navigation methods as will be shown in detail hereafter.

Each of the repository type library objects 104, 106, and 108 respectively, will have the objects representing the classes, interfaces, properties, collections, and relationships defined in that particular tool information model with interconnections between the above elements being represented by relationships. For example, repository type library 104 will have a plurality of class definition objects 110, one corresponding to each class defined in the model. Likewise, for each of the plurality of class definition objects 110 there is related through an Implements 112 relationship (represented by linear connections through dashed boxes) an interface definition object corresponding to each of the interfaces implemented by an individual class. The interface definition objects 114 will then be broken down into their individual properties, collections, and relationships (shown in detail by an actual example). Furthermore, all objects (or object states) within the type definition model are related to the type definition model object 104 corresponding to tool information model 1 by way of an IScopeFor relationship 116 (represented by linear connections through dashed box) allowing a different navigational path for quicker access of properties.

The repository type library object 106 for tool information model number 2 also has a plurality of related class definition objects 120 that will implement interfaces represented by the plurality of interface definition objects 122 and are related by the Implements relationship 124. All the class and interface definitional objects are related to the repository type model object 106 through an IsScopeFor relationship 126. In like manner, all of the repository type library objects on down to repository type library object 108 follow this same pattern.

The repository type definition model object hierarchy as shown in FIG. 3 is navigated or traversed when a generic repository object of a class according to the defined model needs to emulate behavior for a particular type of object. While such a traversal can occur in many different ways as can be appreciated by those skilled in the art, one currently preferred embodiment uses OLE automation technology built upon the COM object model with some specific modifications made to the IDispatch interface and to the QueryInterface method of the IUnknown interface. Naturally, the calling conventions will be the same as any other implementation as seen from the client but the internal workings are different so that an implicit traversal of the type definition model object hierarchy may occur so as to emulate proper behavior.

Some examples of emulated behavior include "get" and "put" methods for accessing and setting property values. An object class composed of a single interface with a number of properties could be entirely emulated by a generic repository object as long as the class is defined in the type definition model object hierarchy.

Another example is the implementation of collections and relationships. Collections are sets of property values and can be wholly defined and implemented by the repository system. The currently preferred embodiment collections may contain scalar values (e.g., integers, strings, etc.) or may be object valued. An object valued collection contains a set of stored object state IDs that can be used during object navigation to set an instantiated object to the correct state.

Collections have four different methods for manipulating the data therein: the Add and Remove methods will respectively place or delete an element into or from a collection; the Item method will retrieve a specific element from the collection; and the Count method will return the number of elements contained in the collection. Those skilled in the art will note that a collection may be implemented in a variety of different ways. For example, a separate collection object may be used or a particular object may support an interface that defines collection functionality.

Relationships are defined at their most elemental level as a link between objects. This link is defined as a pair of collections on the interfaces to be linked, thereby linking the objects that implement the interfaces. The collections may be of direct references to objects (i.e., stored object state IDs) or to special relationship objects. This behavior and its implementation will be discussed more fully hereafter.

When a generic repository object receives a method request for a particular interface supported thereon (e.g., a "put" property method), the instantiated generic repository object will have certain information according to its instantiated internal state. For example, it will have a class ID, an interface ID, an index as indicating which member function to call for tat method request, and access to the internal state of the object. At the time of writing the software class to support or implement the generic repository object, none of these actual values could be known, therefore requiring that the actual code use a mechanism that could dynamically behave based on those values as they are established because of instantiation (e.g., a generic repository object of a particular class) and dynamic operation (e.g., somehow remembering which interface pointer or ID the client is using) and processing them appropriately.

The type value for the generic repository object will be used to arrive at the appropriate class definition object in the type definition model hierarchy. From there, an interface ID can be used to navigate to the proper interface definition object in the type hierarchy. At this point, the dispatch ID, which is a numeric index offset, can be interpreted to navigate to the correct property definition object, collection definition object, relationship definition object or any other terminal definition object requiring state storage that will have information saved in the SQL database. For example, a property definition object having been traversed in this manner and having all the pertinent information including a stored object state ID and interface ID, will be able to issue an SQL query to the appropriate interface table using the stored object state ID to access the correct row and interpretation of the method used to arrive at the correct column to thereby access the value stored therein and return it to the invoking client. This entire process is facilitated using OLE automation.

The terminal definition objects (property, collection, relationship, etc.) will have incorporated therein functionality for defining and creating the SQL structures for the particular component in order to assist the repository engine in creating, modifying, and otherwise managing the SQL database. Since any values used to do this are themselves stored in the SQL database as properties etc., the system is said to be self-describing and uses recursion to arrive at the fundamentally defined information.

It may be noted that other ways of accessing and using type definition information may be established without departing from the basic concepts of the present invention. Currently, this self-describing method is viewed as advantageous since less actual code need be written and maintained because the self-describing method explained herewith leverages off of recursive invocations. A smaller body of code is easier to maintain and to modify as enhancements are desired. As added repository behavior beyond the storage of properties and relationships is implemented into an expanding repository services model, such future components will be relatively easy to integrate due to the self-describing manner in which the type definition model information is implemented.

Figure 4:
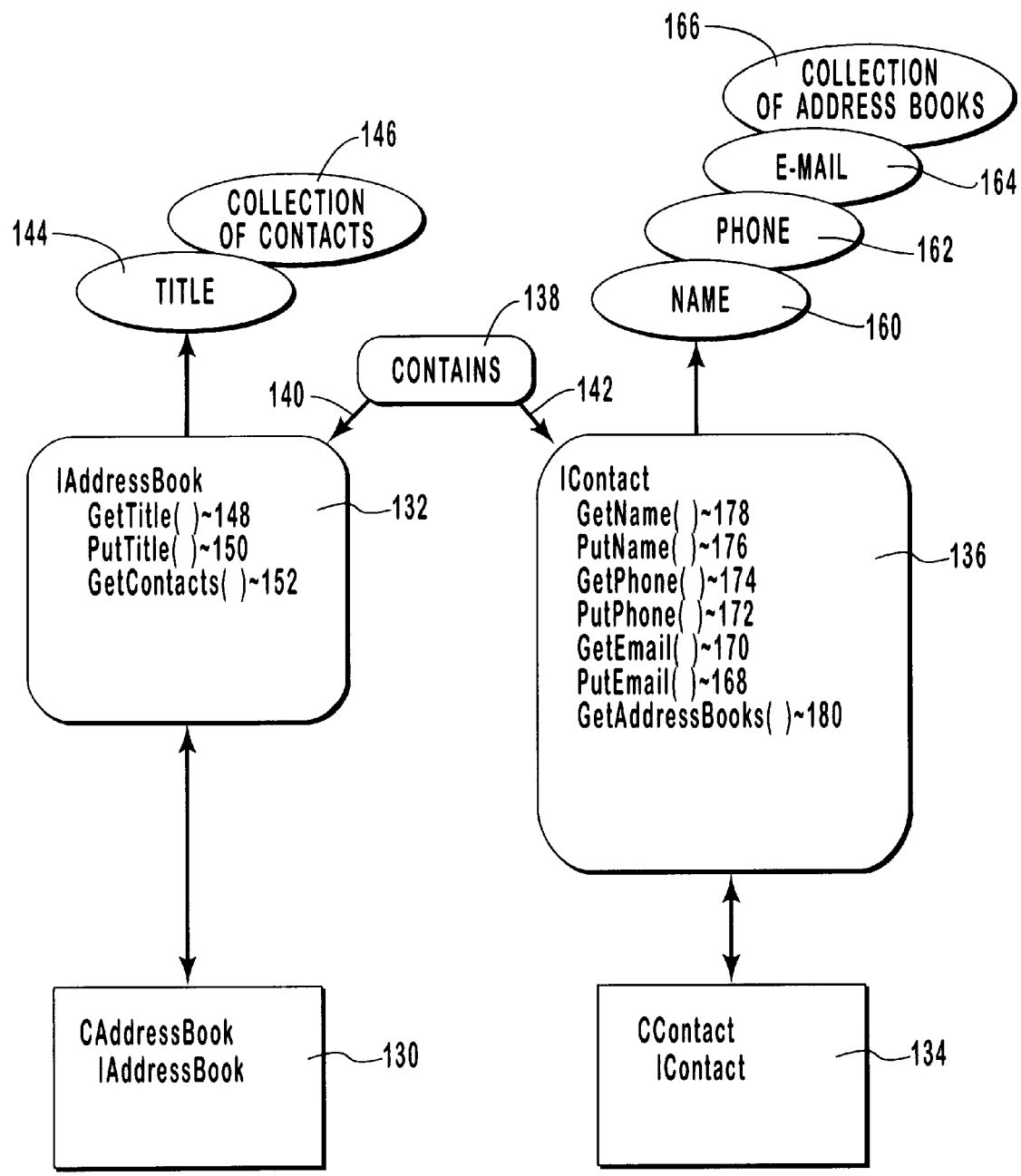
FIG. 4 is a logical diagram depicting the class, interface, and relationships for an address book example that has an address book class and a contact class.

FIG. 4 is a logical diagram showing the class and interface relationship of an address book example that will be used throughout this application to illustrate the operation of the currently preferred embodiment of the present invention. An address book will contain entries of information called contacts to represent persons. Each contact will contain information for a person's name, phone number, and e-mail address.

Two classes are defined for creating two different types of objects in order to logically implement the address book example as shown in FIG. 4. First is the CAddressBook class 130 that implements the IAddressBook interface 132 while the other is the CContact class 134 that implements the IContact interface 136. Furthermore there is a contains relationship 138 between the IAddressBook interface 132 and the IContact interface 136. The arrows 140 and 142, respectively, indicate that the IAddressBook interface 132 is the origin interface while the IContact interface 136 is the destination interface by definition. The contains relationship 130 itself, however, is a bi-directional link between the two interfaces and either interface is equally available to the other interface by navigating the contains relationship 138. The origin and destination designations affect the storage layout of relationship instances and the semantics of certain operations on relationships. A source object is where a navigational session begins and the target object is the resulting object that is reached by navigating the relationship.

The IAddressBook interface 132 contains as data the title property 144 as well as a contacts collection 146. The values for the title property 144 and the contacts collection 146 are only available through methods defined on the IAddressBook interface 132. More specifically, the GetTitle method 148 and the PutTitle method 150 will retrieve or place a value into the title property 144, and the GetContacts method 152 will retrieve a contact collection 146.

In like manner, the IContact interface 136 has a name property 160, a phone property 162, and an e-mail property 164 in addition to an address book collection 166. In order to manipulate the properties and address book collection the following methods exist: GetName method 178; PutName method 176; GetPhone method 174; PutPhone method 172; GetEmail method 170; PutEmail method 168; and GetAddressBooks method 180. These methods all operate in like manner as explained previously with the methods of the IAddressBook interface 132 to manipulate the data values of the name property 160, phone property 162, and e-mail property 164, respectively, and the address book collection 166.

The contact collection 146 and address book collection 166 are used to implement the contains relationship 138 as will be shown in more detail hereafter. As explained previously, collections have four different methods for manipulating the data therein: Add, Remove, Item, Count methods.

Figure 5:
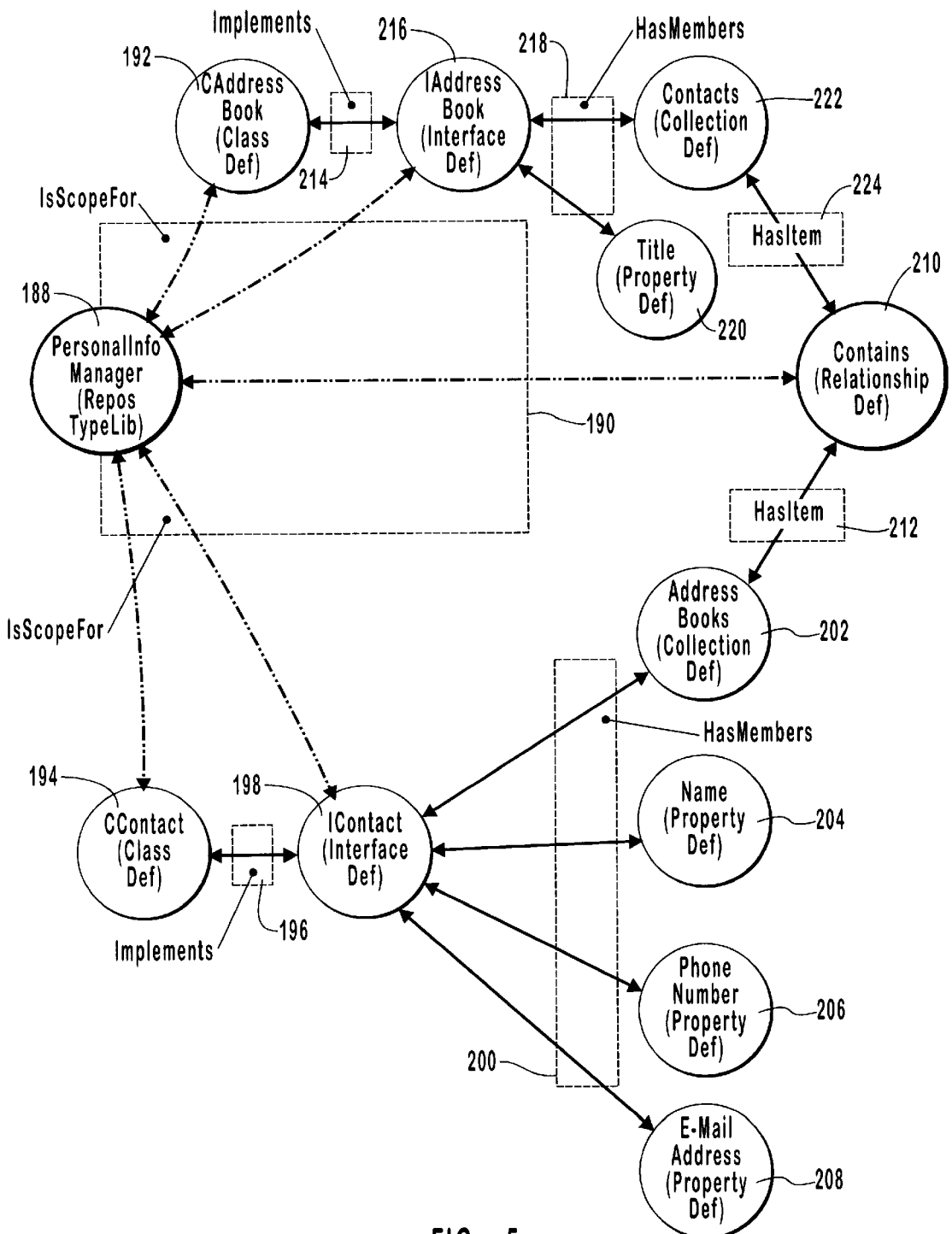
FIG. 5 shows the type information for the logical diagram shown in FIG. 4 that will be used by the repository engine to provide correct object behavior to a generic repository object and create appropriate storage definitions in the SQL database.

In order to make the information representing the logical diagram of FIG. 4 available to the repository system as type definitions, FIG. 5 shows an object hierarchy for the type information corresponding to the logical relationships shown in FIG. 4. Related to the root object of a repository is the repository type library object 188 for a personal information manager. This object with all its various interfaces will be implemented by the CReposTypeLib class as shown in parentheses within the repository library object 188.

A relationship exists between the repository type library object 188 and each type definition of a repository object or relationship object, namely, class definitions, interface definitions, and relationship definitions. These relationships are illustrated by the dashed lines extending to each other object in the model shown in FIG. 5 and encompassed by the IsScopeFor box 190 representing that relationship.

The two classes CAddressBook and CContact are represented by class definition objects 192 and 194, respectively. There will be a class definition object for each class in a tool information model. When a generic repository object is created, it will be assigned a type in order to emulate a certain class of object. For each type that a repository object is capable of having, there will be a corresponding class definition object in the tool information model as shown by the specific example in FIG. 5 and generally in FIG. 3.

An Implements relationship represented by box 196 will include objects representing all the interfaces supported by the CContact class. In this case, interface definition object 198 for the IContact interface is contained therein.

The IContact interface definition object 198 will be used by the repository engine to define an SQL database table corresponding to the IContact interface. Each instance of IContact in the repository, regardless of the class implementation, will store state as a row entry in this table. The actual column definitions are determined by navigating the HasMembers relationship (box 200) to arrive at the properties and collections defined on the IContact interface.

Related to the IContact interface definition object 198 are objects representing each of the properties contained by that interface. The HasMembers relationship between these objects is represented by box 200 and will indicate four objects: a collection definition object 202 for representing the address books collection on the IContact interface, property definition object 204 representing the name property, property definition object 206 representing the phone number property, and property definition object 208 corresponding to the e-mail address property. Each property definition object 204, 206, and 208, respectively, will define a column in the interface SQL table corresponding to the IContact so that the proper storage may be allocated for persisting these properties in the database. The collection definition object 202 representing the address books will be related to a relationship definition object 210 by a HasItem relationship 212 (represented by linear connections through a dashed box).

A class definition object 192 for the address book class will have an Implements relationship 214 (represented by linear connections through a dashed box) containing a reference to an interface definition object 216 representing the address book interface. Likewise, the interface definition object 216 for the address book will have a relationship HasMembers 218 (represented by linear connections through a dashed box) containing a property definition object 220 representing the title property and a collection definition object 222 having or representing the contacts collection. These objects will function as explained previously. The collection definition object 222 representing the contacts collection will have a HasItem relationship 224 (represented by linear connections through dashed box) and contained therein the relationship definition object 210 representing the contains relationship.

This type information hierarchy is used for giving the correct behavior to a generic repository object and for assuring proper allocation and design of database tables in order to persist the entire structure of the repository and store object state as explained previously.

It may be noted that the tool information model as described in FIG. 5 will require no actual code for implementation of its functionality. The repository system will be able to emulate all methods for the defined interfaces through a generic repository object and the type definitions as illustrated. In this way, quick prototyping can be achieved without requiring compilation of source code and redeployment. Other tool information models will require the designer to provide executable code for implementing specific interface methods. One possible tool information model requiring code will be shown in connection with an extensibility example shown hereafter.

The present invention may be extended by giving the generic repository object auto-wrapping ability so as to automatically extend other objects in such a manner that whenever a particular interface is defined to the repository system, any class can be defined to use that interface without reimplementing the interface with new code. The generic repository object with auto-wrapping would create an object having that interface. Such a system would have great benefits as a quick proto-typing system.

D. Active Object Hierarchy Example

Figure 6:
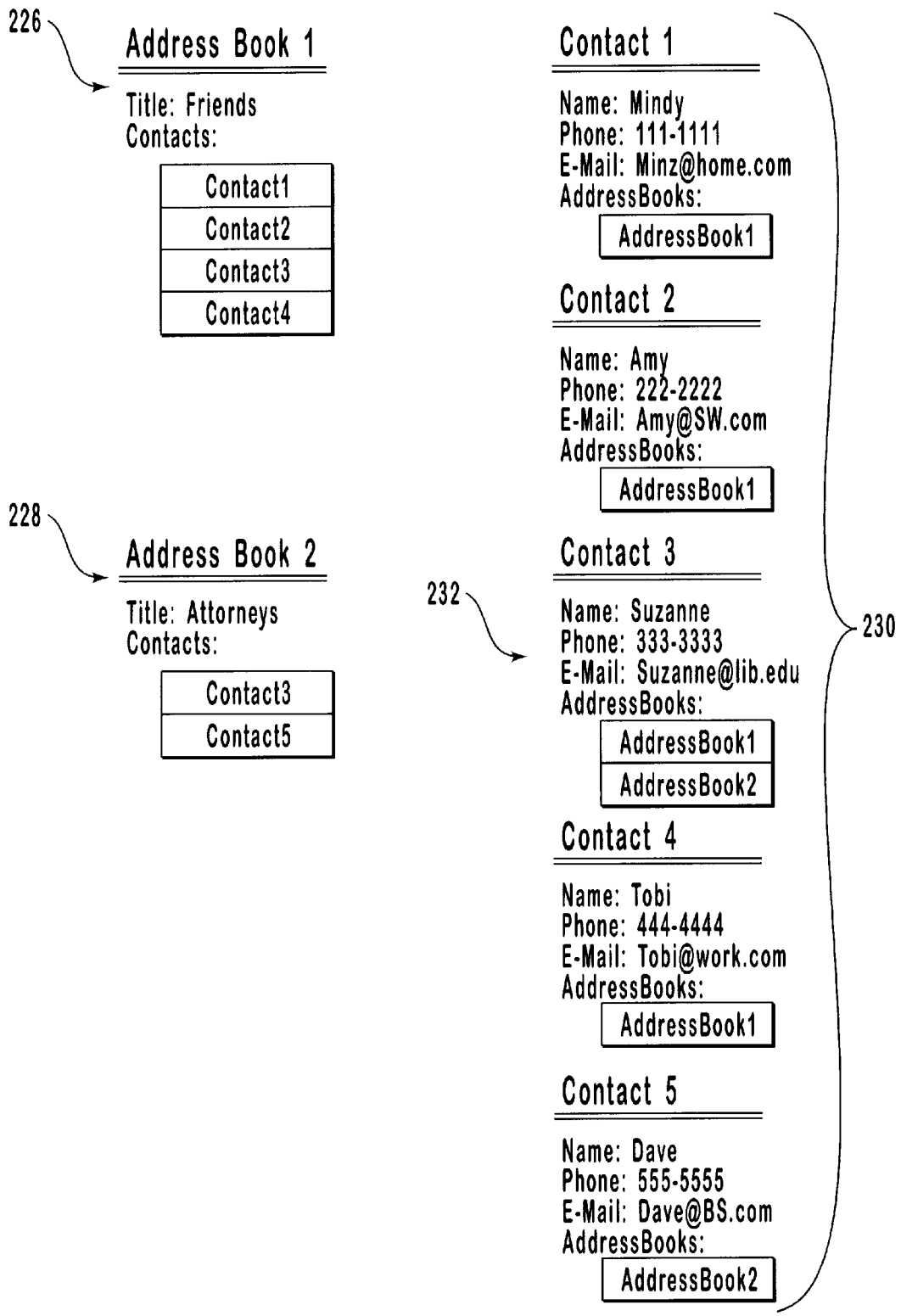
FIG. 6 is a diagram showing the values for a number of contacts and address books according to the logical model in FIG. 4. Specifically, the property information for five contacts and two address books is shown.

FIG. 6 is a drawing of actual data values to be used with objects for the address book example structurally illustrated in FIG. 4 and shows the interrelationships between address books and contacts. Shown in FIG. 6 is address book 226 with the title of "Friends" containing four individual contacts. Address book 228, on the other hand, is entitled "Attorneys" and contains only two contacts. A group of five contacts 230 is shown each having unique values for the respective properties including the address books that contain the contact. Each contact has a name property, a phone property, and an E-mail property. It may be noted that contact 232 is included in both address book 226 and address book 228.

Figure 7:
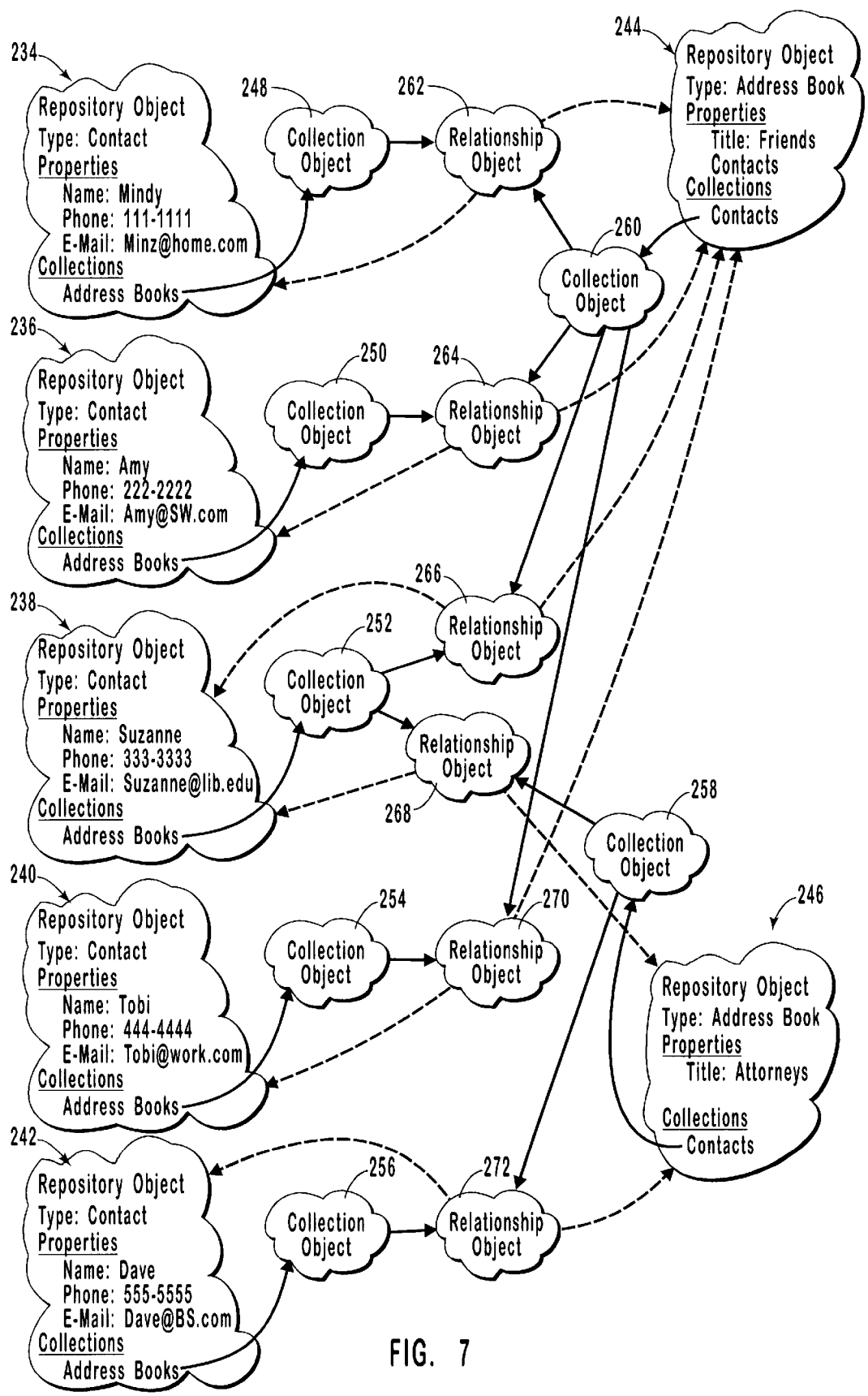
FIG. 7 is a repository object map showing all of the active COM objects used in creating a repository for the information of FIG. 6 in a currently preferred embodiment.
Figure 12A:
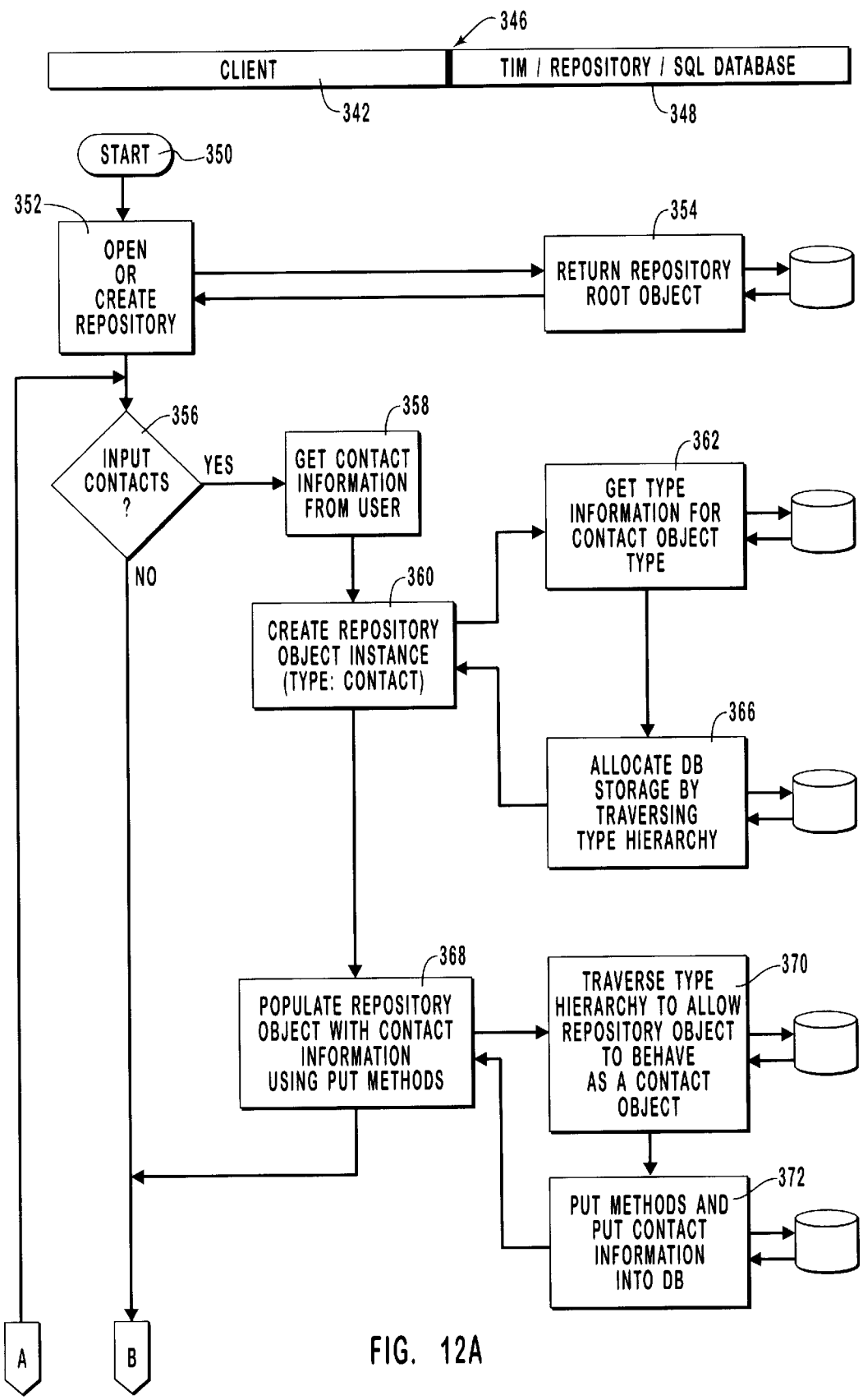
FIGS. 12A, 12B, and 12C, taken together, are a flow chart showing for a hypothetical address book data entry program using the repository of the present invention with classes defined to the repository engine corresponding to the address book example of FIGS. 5 and 6.
Figure 12B:
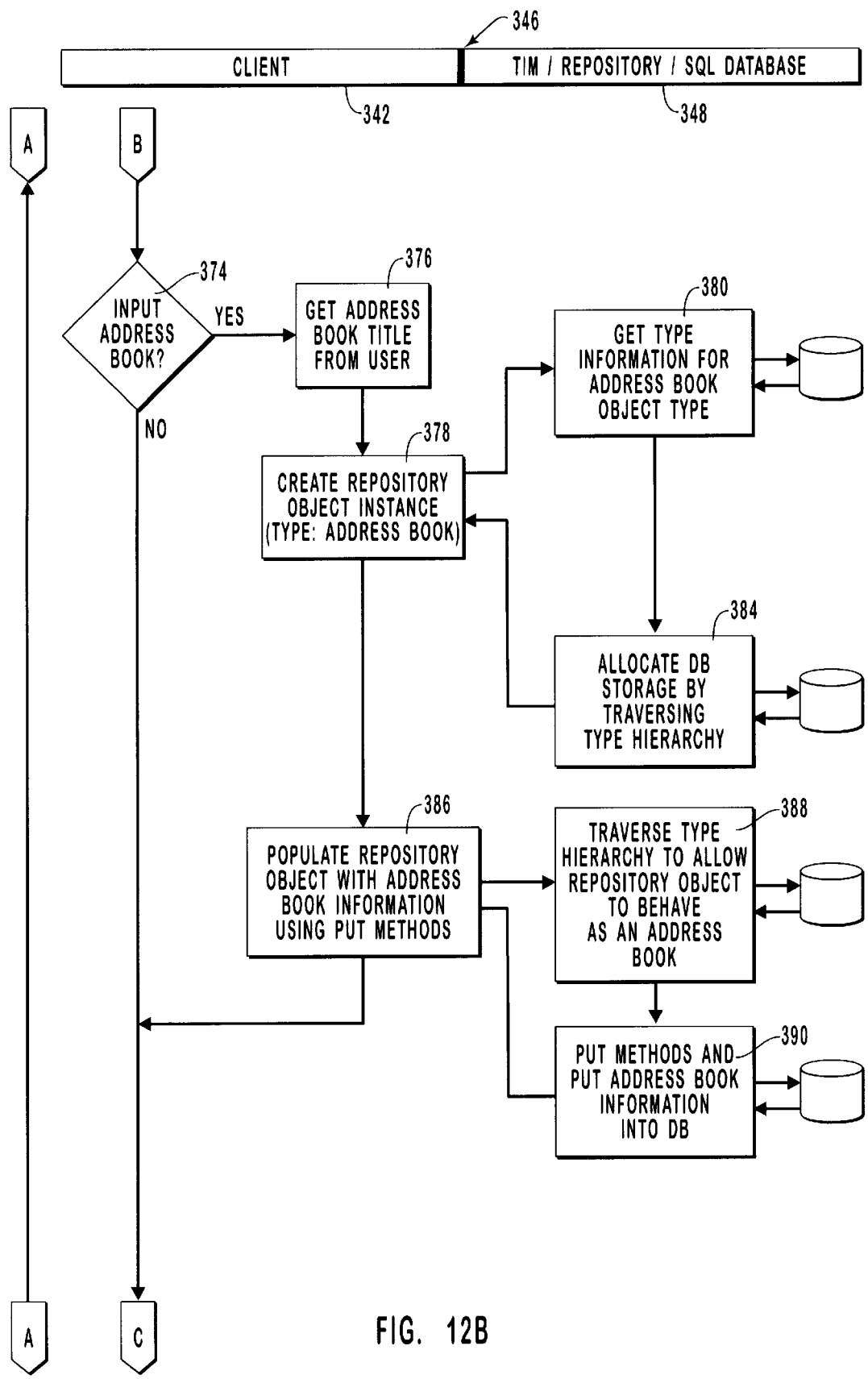
Figure 12C:
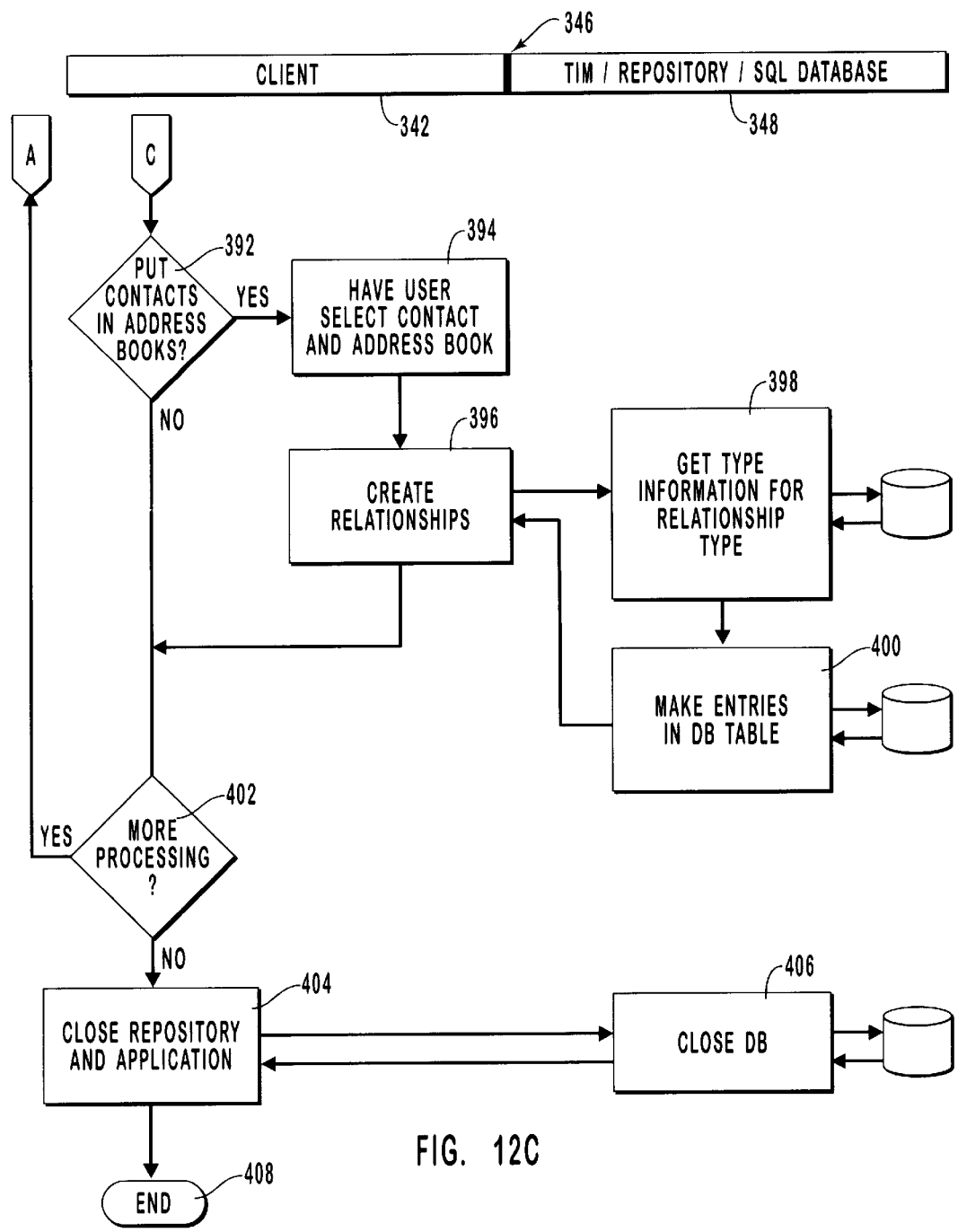

FIG. 7 shows the active object hierarchy as implemented by the repository system. FIGS. 12A–12C are flow charts of a possible program that may be used to interact with the repository or create the repository and object structure as shown in FIG. 7, and will be explained in more detail hereafter. Each object shown in FIG. 7 is a COM object known only through its respective interfaces. Generic repository object 234 will behave as a contact object having the properties and collections illustrated. Likewise, generic repository objects 236, 238, 240, and 242 will also behave as contact objects. This occurs because each respective instance of the generic repository object will traverse or otherwise acquire type definition information in order to know how to behave when a client accesses the respective objects through their interfaces.

Likewise, generic repository objects 244 and 246 act as if each is an address book object based on the type information. While the type model definition will contain the information necessary to enable a generic repository object to emulate a given object of a certain class, the tool information model designer will need to register the object class in the system registry. In order to get the system to load the server for a generic repository object, each different object type in the COM registry emulated by a generic repository object will use a "treat as" entry referring to the generic repository object server so that the COM system will instantiate another generic repository object that will, in turn, mimic or emulate the characteristics of the signified object type. For simplicity of notation the term repository object used alone will mean a generic repository object.

As illustrated herein, collections are implemented as separate collection COM objects. Collection objects 248, 250, 252, 254, and 256 are associated with the contact repository objects 234, 236, 238, 240, and 242, respectively. Each collection object will contain a collection of relationship objects signifying a relationship between the contact object and any address books in which it may be contained. There will be one relationship object for each such generic relationship so that if a contact type generic repository object is contained in two address book type repository objects, there would be two relationship objects associated with the corresponding collection objects. This is the case for repository object 238 having collection object 252 that indicates relationship object 266 and relationship object 268 as contained in that particular collection. Relationship objects 262, 264, 266, 268, 270, and 272 represent all the relationships found in this example. The dashed lines from the relationship objects to the repository objects will be followed depending upon which direction the relationship object was arrived at during object hierarchy navigation.

Though all objects are shown in FIG. 7, actual object instantiation will not normally occur until using a method on an already instantiated object for navigation. Actual objects are not directly referenced and it is through the stored object state IDs that actual navigation is accomplished. Once the correct stored state is encountered, an object is instantiated and "loaded" with that state and handled in the normal fashion using interface references.

Those skilled in the art will note that there are many ways to implement the object structure over the state data. For example, collections have been implemented using an actual object for accessing and manipulation as shown in FIG. 7. The collection object is accessed (i.e., a handle to an interface of the collection object is obtained) using the GetAddressBooks or GetContacts methods of the respective generic repository object. Alternatively, internal data could be allocated within the generic repository object and the methods for manipulation implemented as an interface to the generic repository object rather than a separate object altogether as shown in FIG. 7.

Conversely, the properties shown as part of the generic repository objects shown in FIG. 7 could also be implemented as separate objects. The currently preferred embodiment does implement properties as separate objects with access and instantiation of these objects occurring through navigational member functions. FIG. 7 is operationally the same but does not indicate the separate objects for each property.

E. Relationships and Repository Navigation Model

Figure 8:
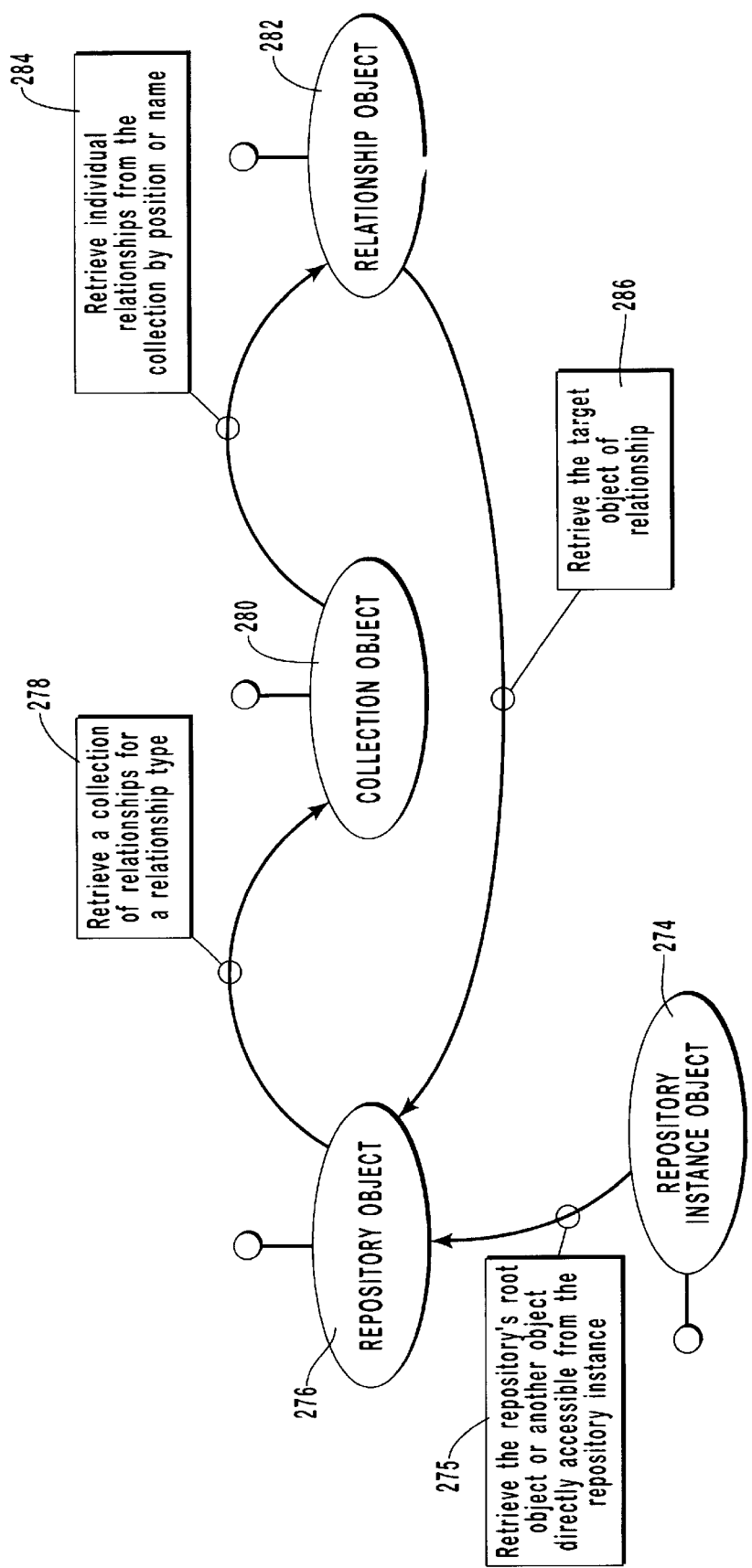
FIG. 8 is a logical diagram showing the relationship navigation model for a currently preferred embodiment of a repository showing the different types of objects and their linkages to one another.

FIG. 8 is a traversal model showing how a client would navigate through the repository. A client gains access to a repository by creating a repository instance object 274 which represents a repository database, and creating or opening a database, so that the repository instance object 274 can be used as a connection to said database. From the repository instance object 274, collections or other instrumentality such as obtaining the unique root repository object for said database or addressing a generic repository object by name or stored state ID will allow the client to gain access to a repository object 276. Again, a repository object may be either attained from the repository by a direct stored object state ID or by following a relationship. While terminology speaks of navigatory objects, it is important to remember that it is the stored object state that allows navigation and objects are instantiated as correct stored object states are found. The stored object states are loaded underneath and it appears as a simple object traversal using interface methods.

Once at the repository object 276, relationships will be ultimately accessible by retrieving a collection of relationships as illustrated in 278. Having accessed a collection object 280 listing the relationships of a relevant type, a selected relationship object 282 is acquired. This may occur in a number of different ways as illustrated in 284 where the individual relationship may be retrieved from the collection object by position or name. Once the relationship object 282 is obtained, another repository object 276 may be retrieved as the target object of the particular relationship object 282 as illustrated in 286.

For example, beginning at generic repository object 238 (contact type) in FIG. 7, a client may wish to arrive at the generic repository object 246 (address book type). First, the client would gain access to the collection object 252 indicating all the relationships that contact type generic repository object 238 has with other address book type generic repository objects. Next, the relationship object 268 representing the relationship between repository objects 238 and 246 will be accessed through the appropriate interface. Finally, the destination repository object 246 may be accessed from the relationship object 268 (shown by dashed line FIG. 7).

F. Database Mapping

Figure 9:
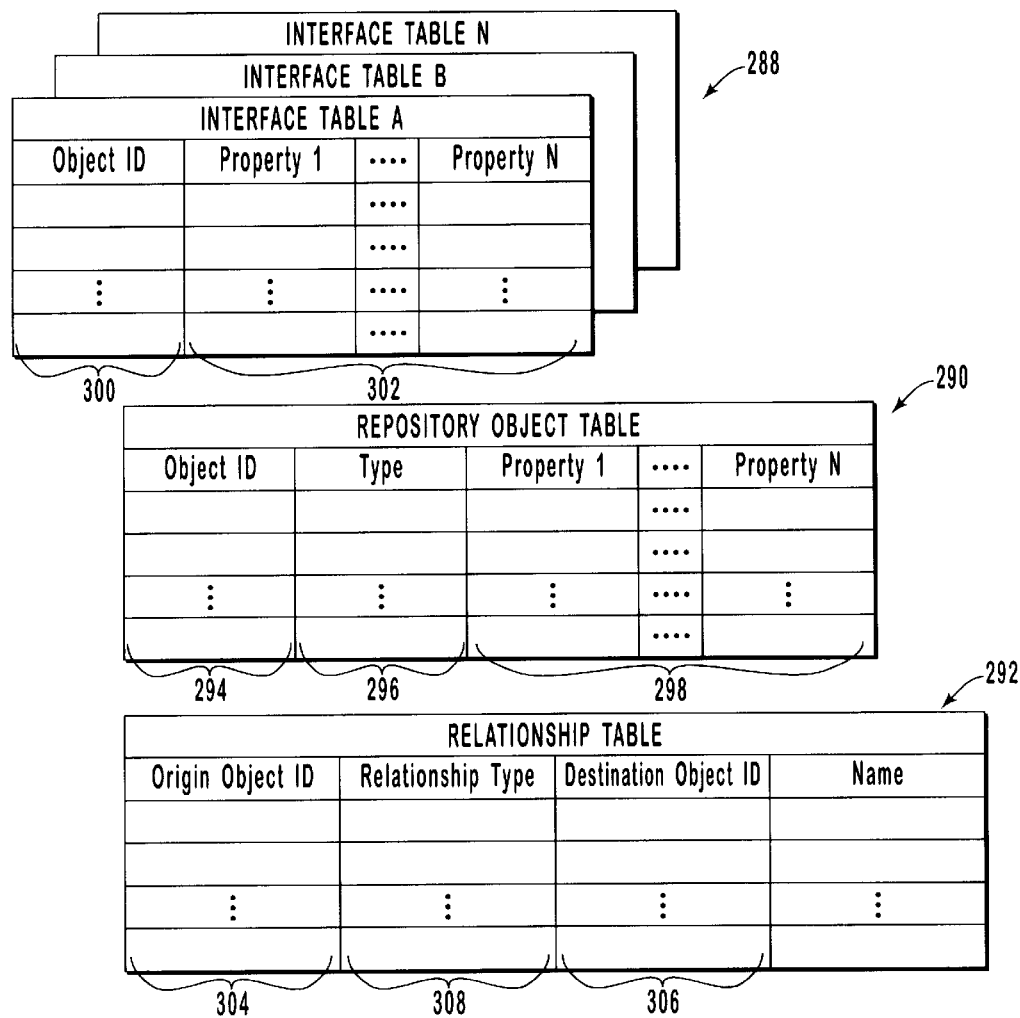
FIG. 9 is a general drawing of tables found in an SQL database corresponding to the objects of the repository that are used for storing object state, relationship information, and repository management information.

FIG. 9 shows a generic representation of the different tables used in the SQL database to persist the state of all the objects in the repository, thereby persisting such objects. These include a plurality of interface tables 288, a main repository stored object state table 290, and a relationship table 292.

The main repository object table 290 will identify, by each row, each and every object state in the repository. The columns of the repository object table 290 will include an object ID column 294 representing the stored object state, an object type column 296, and a plurality of property columns 298 for properties and other information that are common to all objects and should be stored. The plurality of properties columns 298 would include time last updated, etc.

Interface tables 288 include an interface table for each type of interface supported by objects defined in the type model and that are part of the repository system. While separate interface tables may exist for the same interface implemented by different classes, it is more efficient to have one interface table for each interface regardless of how many classes implement the interface. Each individual interface table will include a column for an object ID to link it to the corresponding object state found in the repository stored object state table and columns for each property unique to that particular interface. Objects implemented by different classes but having common interfaces will store the particular interface state on the same interface table in the SQL database in the currently preferred embodiment. As mentioned previously, it is sometimes useful to organize database tables differently (e.g., mapping multiple interfaces to the same table or creating a different interface table for each class that supports an interface).

The relationship table 292 indicates relationships between two object states found in the repository system. Accordingly, column 304 indicates an origin object ID while column 306 indicates a destination object ID, each object ID referring to a stored object state. Origin and destination are directional and defined by the relationship's type definition identified by relationship type 308. However, a relationship is bi-directional, meaning that either object can be found through the relationship object from the other object. Terminology for navigating a relationship is relative to the origin and destination depending on the starting point. The beginning point object is the source object while the ending point object after passing through the relationship is the target object regardless of which may be the origin or destination object.

The relationship table 292 contains the minimum amount of information necessary to connect the two object states found in the database. Implementation details of how relationships between objects may be implemented is explained in more detail in a co-pending Application Ser. No. 08/822,449 entitled "Method and Computer Program Product for Implementing Object Relationships" which is herein incorporated by reference.

In addition to indicating the origin and destination types of the relationship, the relationship type column 308 allows queries on the SQL database 56 by relationship type. Functionality can also be associated with a particular category of relationship through COM objects. For example, a "Contains" type relationship may have different functionality in the form of various interfaces on a relationship object than does a "DependsOn" type relationship. Furthermore, because a relationship is implemented as a COM object, the functionality may be extended using COM extension mechanisms so that custom validation routines or other specific behavior may be added.

Figure 10:
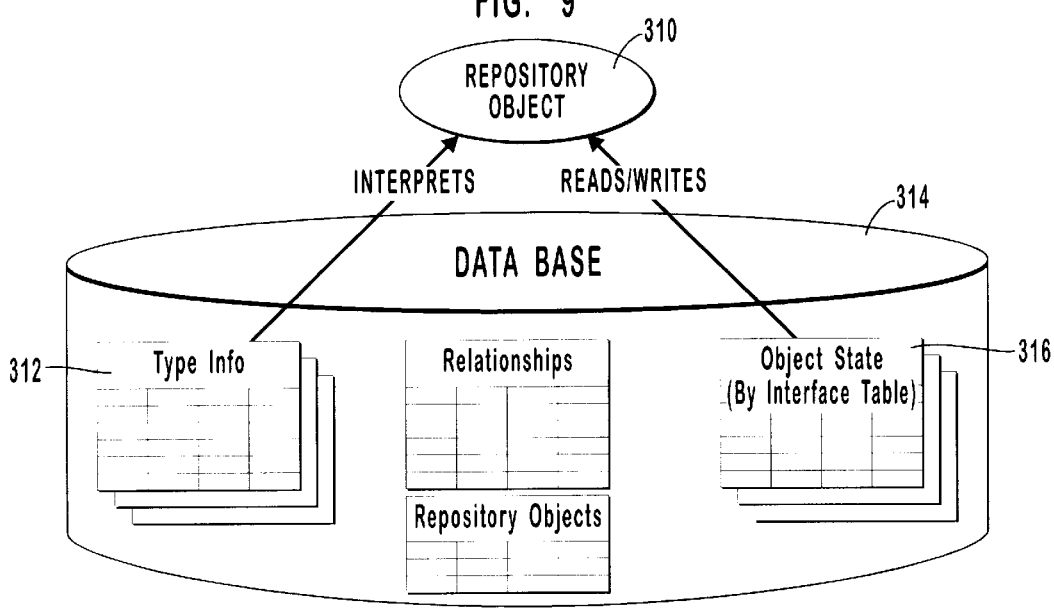
FIG. 10 is a logical diagram illustrating how a repository object interprets the type information so that it will behave as a certain type of object while maintaining the object state by writing property values to the appropriate interface tables in the database.

FIG. 10 is a logical diagram showing the relationship of a generic repository object with respect to the SQL database tables. A generic repository object 310 will access type information 312 (stored as part of the type definition model) from the database 314 in order to interpret a request for services from a client. This request may come in the form of a QueryInterface method, or any other interface method supported by the particular type of repository object. The generic repository object 310 maintains the designated object state by reading and writing into the individual interface tables 316 found within the database 314. It will know how, when, and where to read and write based on the command received and the type information 312 associated with a particular instance of generic repository object. Much of this interaction is accomplished using the OLE technology functionality, namely, the OLE automation technology.

FIGS. 11A, 11B, and 11C show the SQL database tables as they would appear for the address book example as illustrated in the object hierarchy of FIG. 7. The repository object table 318 of FIG. 11A will contain an object ID column 320 containing all the object states found in the repository. Additionally, a type column 322 will indicate the type or nature of the object.

There will be two interface tables as shown in FIG. 11B to track the state of the two different forms of interface implemented or supported by the objects, namely, a contact interface table 324 for the IContact interface and an address book interface table 326 for the IAddressBook interface. The contact interface table 324 has column 328 indicating the object ID identifying the stored object state to which the table row pertains, column 330 indicating the value of the name property, column 332 indicating the value of the phone property, and column 334 indicating the value of the E-mail property. In like manner, address interface table 326 has a column 336 indicating the object ID identifying to which stored object state the row belongs and column 338 indicating the title of the address book.

The relationship table 340 of FIG. 11C indicates the relationships between the object states in this example repository, namely between the address books and the contacts contained therein. Relationship table 340 has a column 342 indicating the origin object ID, a column 344 indicating the destination object ID and a column 346 indicating the type of relationship. The rows of relationship table 340 indicate each existing relationship. For example, it can be noted that the address book object stored state identified by the ID of 14 will contain four contacts with object IDs 16–19, respectively. Likewise, the address book object stored state with an object ID of 15 contains two contacts, namely contacts represented by objects having object ID 18 and object ID 20. It may be noted that the contact represented by object ID 18 is contained in two address books, or both address books.

G. Repository Use

FIG. 12A–12C is a flow chart for a simple data entry program that could be used to create the repository and subsequent object structure of that repository as illustrated in FIG. 7. Above the flow chart is a bar 346 illustrating the portions of the flow chart that are client developed code, portion 342, and portions of the flow chart handled by the tool information model implemented on top of the repository engine that accesses the SQL database, portion 348. After initializing and beginning at step 350, the client will open or create a repository using calls to the repository API at step 352.

Calls to the repository API are done by creating a COM object for a repository instance object using the COM CoCreateInstance call. From there, methods are called from the appropriate interfaces. For example, a repository instance object supports the IRepository interface, which has methods for creating a new repository database or opening an existing repository database. When either method is called, a root repository object is loaded, now giving the ability to navigate through an existing repository and/or begin adding new objects therein.

When the repository system receives a call to open an existing repository database at step 354, it will open the database and retrieve information pertinent to the designated repository. It will then load the root object for the repository and load the repository's type definitions for traversal by other pieces of the program for this particular repository.

The client then enters into its main processing loop and determines whether the user wishes to input contacts at step 356. If so, contact information is sought from the user likely through a graphical user interface at step 358. For purposes of the address book example, the contact information sought will be the name of the contact, the contact's phone number, and an E-mail address where the contact may be reached.

The client then creates a generic repository object instance of the type of contact at step 360. This will be done by instantiating a contact object by calling a CreateObject method on the repository instance object IRepository interface. The system registry will map the contact class GUID to a custom server for the contact object or to a generic repository object using a "treat as" entry, which the repository will use to load the appropriate server for the created object. In the example used herein, the "treat as" entry is used so that a generic repository object will act as a contact object.

In order to have the ability to act appropriately, the generic repository object will get type definition information for the contact object at step 362. This may be acquired in a number of different ways, but in a presently preferred embodiment this is achieved by traversing the type definition object hierarchy and using the methods and information therein to create entries into the appropriate SQL database tables for proper object state initialization and persistence. This is achieved in a generic format by means of the OLE automation technology.

It may be noted that collection objects are only instantiated and used when a collection is opened (e.g., using the GetAddressBooks method 180 or GetContacts method 152 shown in FIG. 4). Since no information is inserted into the collection at this point, a collection object is not instantiated. An example of instantiating a collection object and creating the relationship will be shown hereafter.

Finally, at step 366, the database storage is allocated and initialized before the appropriate interface handle is returned to the client. The object is given a unique ID in the main repository object table and all necessary row entries on the individual interface tables are made.

The client, having received the interface to what appears as a contact object at step 360, will begin to populate the repository with the information received at step 358. This occurs at step 368 where the client will issue the appropriate put methods in order to set the data values into the generic repository object masquerading as a contact object. At the binary level, each function call representing the put method uses the standard COM binary conversion and is a certain numerical offset from the VTable of pointers to the actual function implementation in binary code. Again, other object systems with binary extension capabilities may use a different binary convention and the present invention could be implemented thereon.

The generic repository object must traverse the type hierarchy so that it may behave as the contact object at step 370. By knowing the interface pointer previously passed to the client and having the type information as to the nature of the object, the generic repository object will know the nature of the function requested and simulate its behavior. It will be able to pull any parameters off of the execution stack and treat them appropriately as well as return the results in the expected manner.

Upon interpreting a put method at step 370, information is stored or permanently persisted into the database at step 372. Again, this is done using the functionality inherent with the OLE automation technology built upon the COM object model.

Finally, the client regains control after having received the appropriate response from the generic repository object at step 368. At this point, an object has been instantiated and manipulated using its methods to arrive at a given state. For example, repository object 234 of type contact in FIG. 7 having the name property "Mindy," the phone property "111-1111," and the E-mail property "Minz @ home.com" would appear as shown except that the collection object 248 would be empty and not be indicating, holding, or pointing toward the relationship object 262, and therefore not be instantiated. Should the client application terminate at this point, the object state would be fully persisted in the SQL database thereby allowing the object to be accessed again by this client or another client at some future point in time.

Returning back to the main processing loop, the client will determine whether the user wishes to input an address book definition at step 374 on FIG. 12B. To create the address book, it is first necessary to prompt the user for the address book title at step 376. Again, this may occur through a graphical user interface, through reading a file, or any other means.

A generic repository object instance is created at step 378 as was done before for the contact object, however, rather than emulate a contact object it will emulate an address book object. The generic repository object will first get the type definition information for the address book object type at step 380 so that it can emulate correct behavior and allocate appropriate data storage in the database. Next, at step 384, appropriate database storage is allocated by again making reference to the type definition object hierarchy (shown in FIG. 5). This will include entries into the main table, and a row entry into the address interface table. With the object initialized and the storage allocated, the appropriate interface pointer is returned and received at step 378 by the client program.

The client will then populate the repository object with address book information using put methods at step 386 in order to give the object a given state. For an address book object this typically would only require the title of the address book at this time (actual contacts will be put into the address book later). Upon receiving the put method request, the repository object, at step 388, will refer to the type definition information, likely in the form of an object hierarchy (as shown in FIG. 5), in order to behave properly. It may be noted that type definition information may be stored and accessed in different ways as those skilled in the art will appreciate. For example, regular files may be used or the SQL database could be directly accessed without loading any objects or incorporating the type definition information in an object hierarchy.

Behavior emulated would include performing the put method by putting a value requested for the title into the appropriate table of the database at step 390. Finally, control returns to the client with the client having completed the task of creating an address book object and placing that object into a particular state by operating on the properties therein with the appropriate methods on the designated interface.

At the end of step 386, an address book object may be created appearing as object 244 in FIG. 7. However, the collection object 260 will not be loaded because the collection that it implements will be empty since there are no relationships between interfaces of the newly created object and interfaces on other objects. Therefore no reference to or existence of relationship object 262 or any of the other relationship objects 264, 266, and 270 that are shown connected or as members of the collection object 260 will exist at this time.

At step 392, in the main loop of this exemplary data entry program, it is determined whether or not contacts are to be put into address books. If so, the user will select a contact and an address book to be related together at step 394. This may occur in a variety of different ways according to the implementation of the program. For example, a user may simply input the name of the contact and the title of the address book and then allow the program to traverse the database according to the traversal model shown in FIG. 8 and then create the appropriate relationship at step 396. Other options may include traversing the database and displaying the different options to thereby allow the user to select on a graphical user interface the contact and address book to associate. In any event, this information must be available before the relationship may be created at step 396.

The client will create the relationship at step 396 by getting the contacts collection (using the GetContacts method to instantiate and access the collection object) of the relevant address book object to be related. From an interface of the collection object, the Add method on that collection is called with the relevant contact object passed as a parameter. Since the client is working with COM objects, the contact object "parameter" will be an interface handle of the contact object that will be used by the repository engine to arrive at the stored object state ID for the object actually stored in the appropriate relationship SQL database table. The repository will instantiate the relationship object and assure that it is properly listed in the appropriate collection objects on both repository objects as well as retaining the relationship in its persistent state in the relationship table in the SQL database.

To create a relationship object, type definition information for the relationship is ascertained at step 398 while the appropriate entries in the SQL database relationship table are made at step 400. Once the relationship is created with the appropriate linkages, the object hierarchy between the two objects may be traversed according to the model shown in FIG. 8 using member functions.

For example, assuming that the user had selected to place the contact object 234 into the address book type repository object 244 as shown in FIG. 7, then relationship object 262 in FIG. 7 would have been created at the create relationship step 396 of the flow chart in 12C. By using the add relationship method on either of collection object 260 or 248 with the appropriate target object, the appropriate linkages would be made so that the client will traverse objects by way of the interface handles received as a result of navigational methods.

The client main loop will determine if more processing is desired at step 402. If so, then contacts or address books may be created or relationships between existing contacts and address books may be made as explained previously. In this manner, the entire object hierarchy as shown in FIG. 7 may be obtained. Furthermore, since the database functionality is built upon interfaces into the generic repository object itself, and type definition information defines necessary storage requirements, each object defined in type definitions and based on a generic repository object is automatically persisted into the database. Since all objects are persisted, multiple sessions can be used to create the database.

Though all objects are shown in FIG. 7 for pedagogical purposes, an actual client would only have access to those objects it actually created implicitly through the navigational methods and by explicit creation. Because each object state is stored, any client may then create objects through the navigation paradigm as necessary and it is possible that separately instantiated objects may reference the exact same stored object state.

Should this particular session be due for termination as determined at step 402, the application will close the repository and exit at step 404 to conclude operation at step 408.

Part of this close-up procedure will be to close the SQL database at step 406 thereby leaving it in a condition ready for access by other clients as appropriate. The close-up procedure could be implicit by releasing the repository instance object which, having no more references to itself, closes the SQL database, deallocates its storage, and disappears.

As illustrated herein in FIGS. 12A–12C, only the data entry program client will require new code to be written. No specific code need be written to implement the object classes since this may be done simply by type definition information. This is a major advantage of the present invention in that many useful objects may be created without additional software coding effort but only type information defining classes to create objects having specific interfaces. Should more functionality be desired, custom code may be implemented in order to provide additional behavior not supported inherently in the repository system because of the inherent extensibility models available in COM. Additionally, any binary based object model with the appropriate extension capability would have the same inherent benefits should the present invention be implemented thereon. Furthermore, as mentioned previously, automatic object wrapping may be implemented to allow any custom interface (with associated code implementation) that is known to the repository system to be referenced in definitional fashion so that new objects with custom behavior (i.e., behavior not defined to the repository) may be created without writing code. Currently, custom behavior is added using the binary extensibility mechanism of the underlying object system as will be shown in more detail hereafter.

Figure 13:
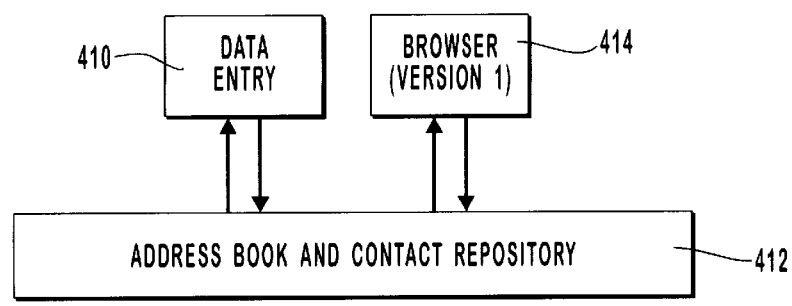
FIG. 13 is a logical diagram showing the address book and contact repository being accessed by two different applications, namely the hypothetical data entry program of FIGS. 12A–12C and version one of a browser to search and display particular address information.

FIG. 13 is a logical diagram illustrating two clients or applications interacting with the address book and contact repository. A data entry program 410 that may operate as illustrated in FIGS. 12A–12C interacts with the address book and contact repository 412 in order to create a database of persistent objects. Furthermore, it may be noted that much of the significant functionality is encompassed in the object definition and implementation for the address book and contact repository 412. Other applications or clients may access the address book and contact repository 412 and an example is shown of a second application, a browser 414, that may also access objects in the address book and contact repository 412.

Browser 414 as shown in FIG. 13 is version 1 that browses many different sorts of files and has functionality for displaying and otherwise accessing the information about contacts and address books found in the repository 412. Version 2 of a browser that will be shown and explained hereafter will add further capabilities and build upon or redefine the object model found in the address book and contact repository 412 using the binary extensibility mechanisms of the underlying object system (COM for this currently preferred embodiment).

Figure 14A:
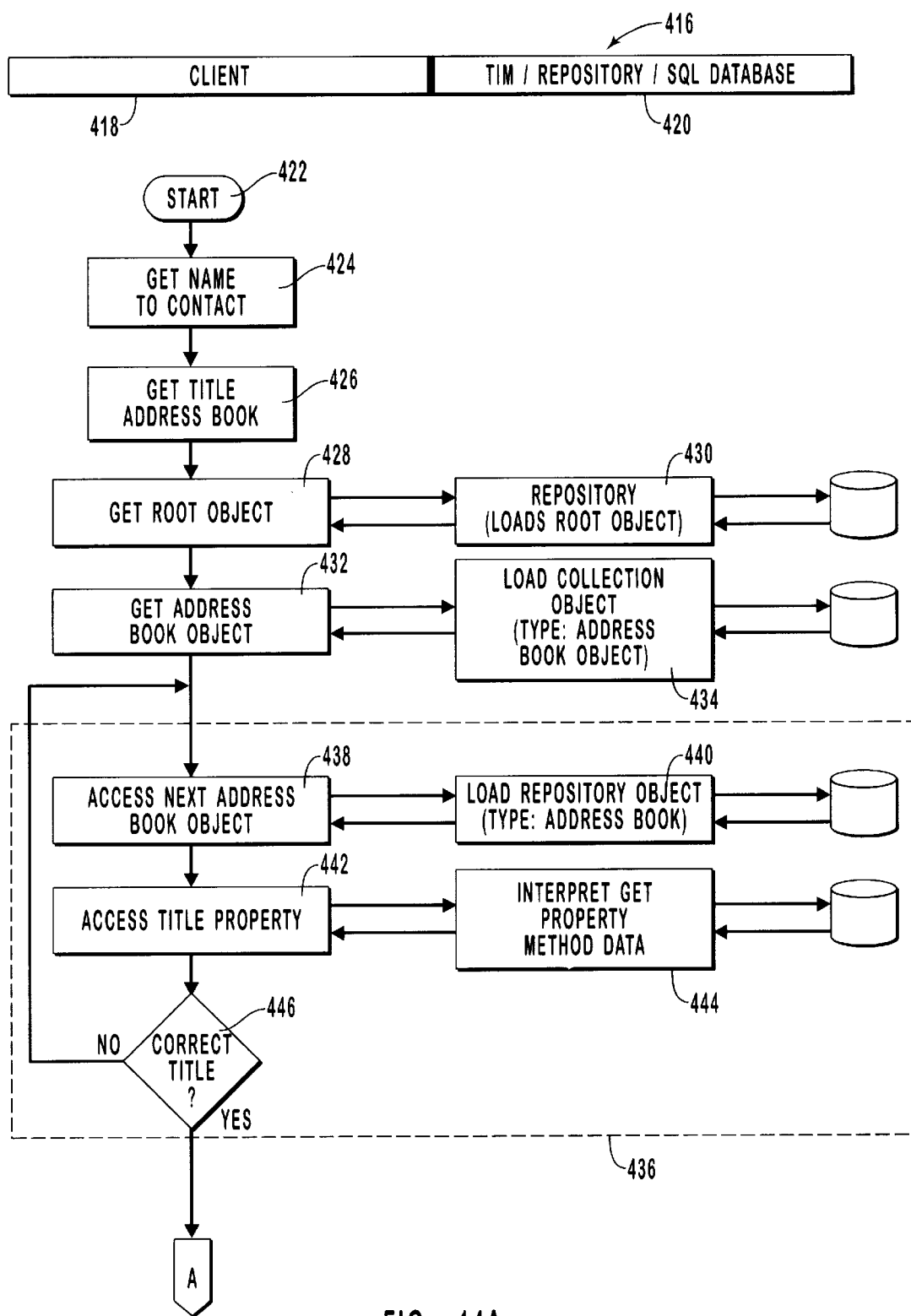
Figure 14B:
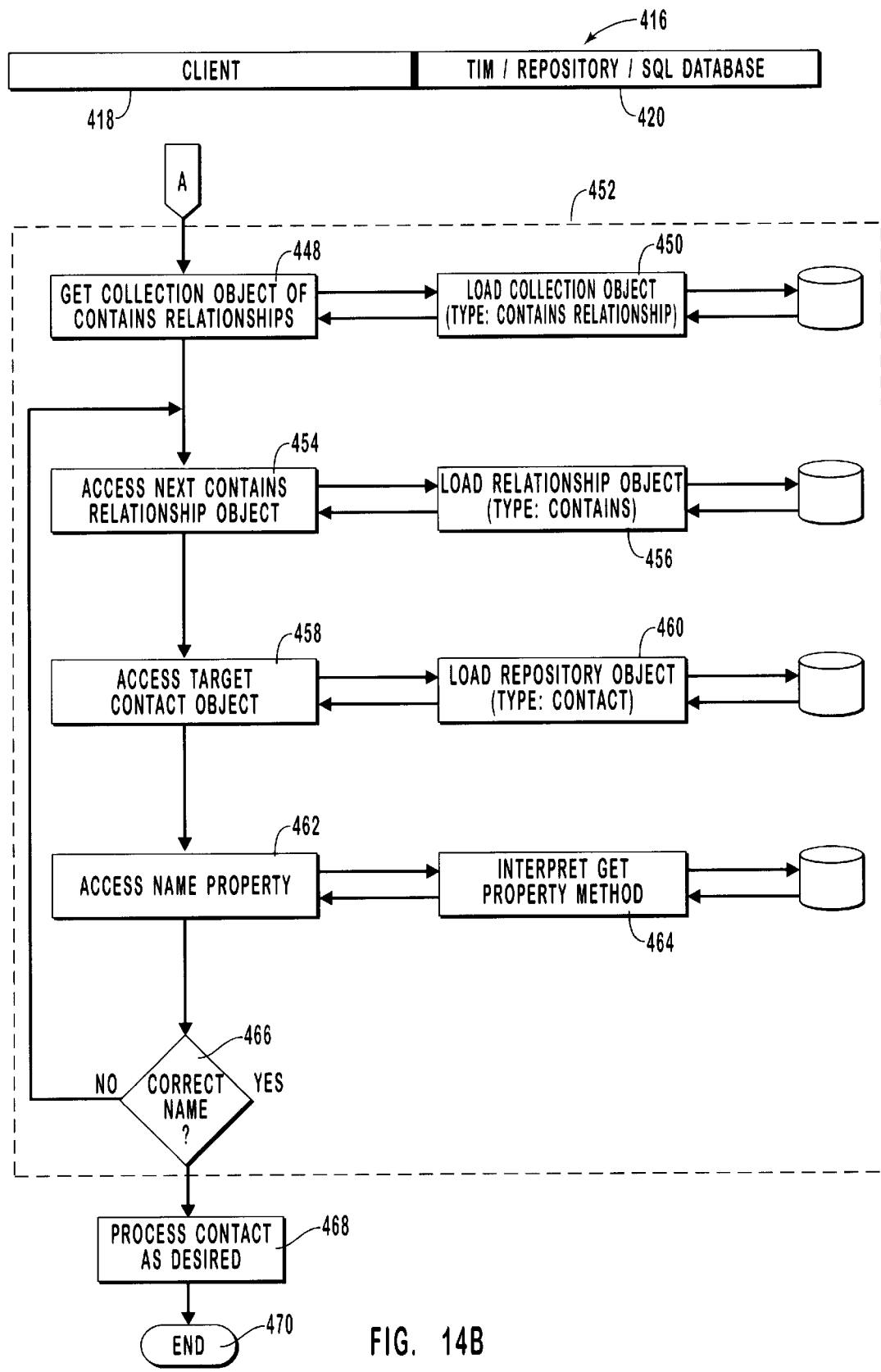

FIG. 14 is a flow chart showing the steps for a portion of the browser program shown in FIG. 13 that will search and navigate the repository for a certain contact name found in a particular address book. The bar 416 directly above the flow chart illustrates those steps taken by the client in portion 418 while those steps handled by the tool information model built upon the repository with inherent database functions is shown in portion 420. The search begins at step 422 and the name of the contact is ascertained from the user or otherwise at step 424. Also, the title of the address book is ascertained at step 426 and with this information the search can begin.

The repository is opened by creating a repository instance object for the repository system through standard COM API functions (e.g. CoCreateInstance) followed by opening a repository database using a repository instance object method that will return a handle to the client of the root object found in step 428. The repository services the request for the root object at step 430 and we will presume a collection object built onto the root object having a number of references to various address book objects.

A root object is an element of a designated repository for use as a known starting point so that the client may navigate through the repository. A root object is likely to be a "normal" repository object with collections of relationships to other objects.

The root object collection of repository objects for address books is requested at step 432 and the repository obliges by loading the collection object at step 434. The first navigational loop signified by box 436 is iterated to find the correct address book by sequentially accessing each address book object using references from the collection of address books acquired at step 434 and testing the title property of each repository object representing an address book until a match is found. This occurs by accessing the next address book object at step 438 thereby requiring the repository system to load a repository object of the address book type at step 440. Methods exist on the collection interface to allow access of objects (e.g., item method) on an indexed basis (first, second, etc.). The client can also use a count method to determine the number of objects in the collection and then sequentially access them.

Next, the client will access the title property issuing the appropriate get method at step 442. This in turn is handled by the repository system that interprets the get property method according to the type definition information for an address book at step 444. This interpretation and service to the get title method will require access to the SQL database in order to get the appropriate value from the appropriate interface table corresponding to the address book interface.

After the client has a title to assess, a test is made to see if it is the correct title at step 446. If not, the rest of the address book objects in the collection are sequentially loaded and accessed until exhausted or until a correct title is found.

Once a correct title is found, then it is known that the correct address book has been determined and the collection object containing all the contains relationships pertinent to that address book is accessed by the client at step 448. The collection object will be loaded by the repository at step 450 with the collection object being of the type contains relationship.

A loop encircled by box 452 includes instructions for traversing through relationships in order to arrive at target contact objects having a name property. Once the correct name is found, the search is finished and the contact may be processed as desired. The loop begins by having the client access the next contains relationship object at step 454. This request is processed by the repository system wherein the relationship object is loaded into the system with the state of the relationship object being accessed from the appropriate SQL database table at step 456. This relationship object will be a "contains" type relationship and will recognize the accessing address book repository object as being the source object with respect to this relationship navigation, again at step 456.

The client at step 458 will then make an access request using interface methods, to the target contact object of the relationship at step 458. The repository system services this request at step 460 by loading a generic repository object of type contact, loading the particular state from the SQL database, and returning a handle to an interface on the newly created repository object. Starting with the address book repository object, accessing a collection object at step 448, using the collection object to access a relationship object at step 454, and finally arriving back to another repository object at step 458 by means of the relationship is an example of navigation according to the model shown in FIG. 8.

The client upon having access to the target contact object as a result of step 458, will access the name property of that repository object at step 462. Again, the generic repository object will interpret the "get" property method by making access to the type definition information in order to return the proper value at step 464. As part of this interpretation, the generic repository object will access the SQL database to retrieve the proper value from the appropriate interface table in order to return the expected property value to the client.

After the client has the name value, determination will be made at step 466 whether the name matches the name being searched. If not, the steps enclosed by box 452 repeat until all relationship objects are exhausted and the correct name cannot be found or until a correct match is determined at step 466.

An alternative way to access contact objects to that described in box 452 is for relationship objects to carry a name property that can be used to directly access desired objects by name. For example, if the relationship from each address book to a contact has a name, then given the address book selected at step 446, the related contact object with a given name could be accessed directly, instead of looping over all relationships in the contacts collection and selecting the one with the desired name.

Once the correct contact is found, it will be processed as desired at step 468 before ending the search procedure at stopping point 470. Processing at step 468 may include simply displaying the contact in its entirety or a portion thereof, printing the contact information or a portion thereof bringing the contact into a document, etc.

With reference to FIG. 7, we will assume that the browser uses the steps as shown in the flow chart in FIG. 14 to find a friend named "Suzanne" within the "Friends" address book. Assuming the first repository object representing an address book would be the "Friends" address book, finding the correct title as iterated by the steps enclosed by box 436 would occur only one time. Beginning with the repository object 244 of FIG. 7, steps 448 and 450 as shown on FIG. 14 would constitute getting access to the collection object 260 of FIG. 7.

Collection object 260 would then be processed by the steps encompassed by box 452 of FIG. 14 in order to arrive at a target repository object of the contact type through the intermediate relationship objects having the relationship linkage information. On the first iteration, steps 454 and 456 of FIG. 14 would provide access to the relationship object 262 of FIG. 7. From this relationship object 262, steps 458 and 460 of FIG. 14 would load and provide access to repository object 234 of FIG. 7. Finally, the client in executing step 462 and the repository system executing 464 of FIG. 14 would determine that the name property of repository object 234 was "Mindy" and would therefore iterate again as determined at step 466 through the steps encompassed by box 452 in FIG. 14 to find the desired name.

The second iteration would again begin at collection object 260 of FIG. 7, access the relationship object 264 in order to arrive at the repository object 236. Again, access to the name property with the value of "Amy" would not be a match and yet another iteration would take place. On the third iteration of the steps encompassed by box 452 in FIG. 14, the collection object 260 of FIG. 7 would lead to relationship object 266 that would give access to the repository object 238. Upon accessing the named property of repository object 238 and finding a value of "Suzanne," the correct name would be found in processing of the designated repository object 238 could proceed as desired at step 468 of FIG. 14.

H. Extensibility Model and Extensibility Example

Figure 15:
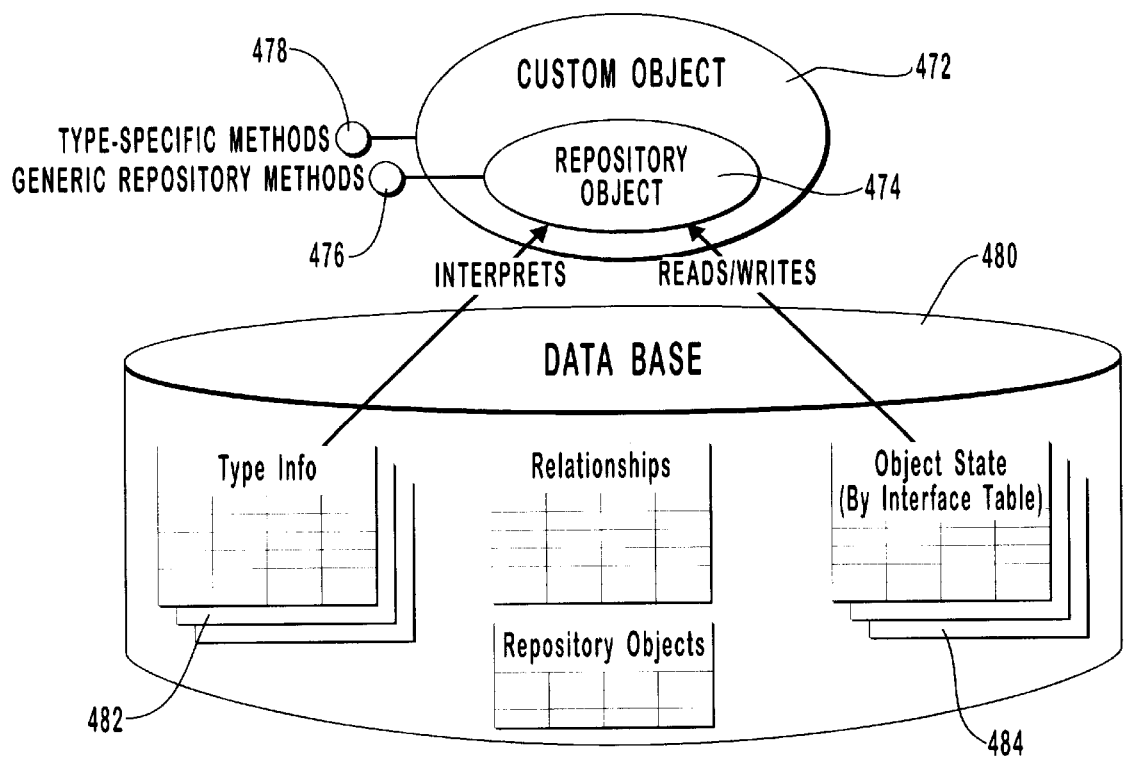
FIG. 15 is a logical diagram illustrating how a custom object that includes interfaces requiring new code (i.e., functionality not inherently supported by the repository engine) would fit with respect to the existing repository object functionality as shown in FIG. 10.

FIG. 15 is a logical diagram illustrating how a custom object can be extended from the generic repository object. A custom object 472 "wraps" a generic repository object 474 in order to provide extended functionality through interfaces. In an interface-based binary object model with binary extensibility, the repository functionality remains available by interfaces accessed through the binary convention while type-specific functionality may be added, including specific executable software in order to support any required interfaces. It may be noted that the functionality of the repository object 474 may be directly available in the new custom object as shown by the extended access point 476 or may be completely internal to the custom object 472 with exterior client having access only to the type specific functionality through the access point 478. The directly accessible functionality corresponds to the COM object model aggregation extensibility mechanism while the non-directly accessible wrapping corresponds to the COM object model containment extensibility mechanism. With some tool information models, repository activity and interaction may be completely hidden from the client.

Regardless of the extensibility mechanism, the repository object 474 will operate in the same way by interpreting information from the database 480 having type definition information 482. In the currently preferred embodiment this type information is organized into a COM object hierarchy that can be accessed as necessary. Additionally, the generic repository object will read and write object state information in interface tables 484 as explained previously, including properties on newly added interfaces as defined in the type definitions.

Figure 16:
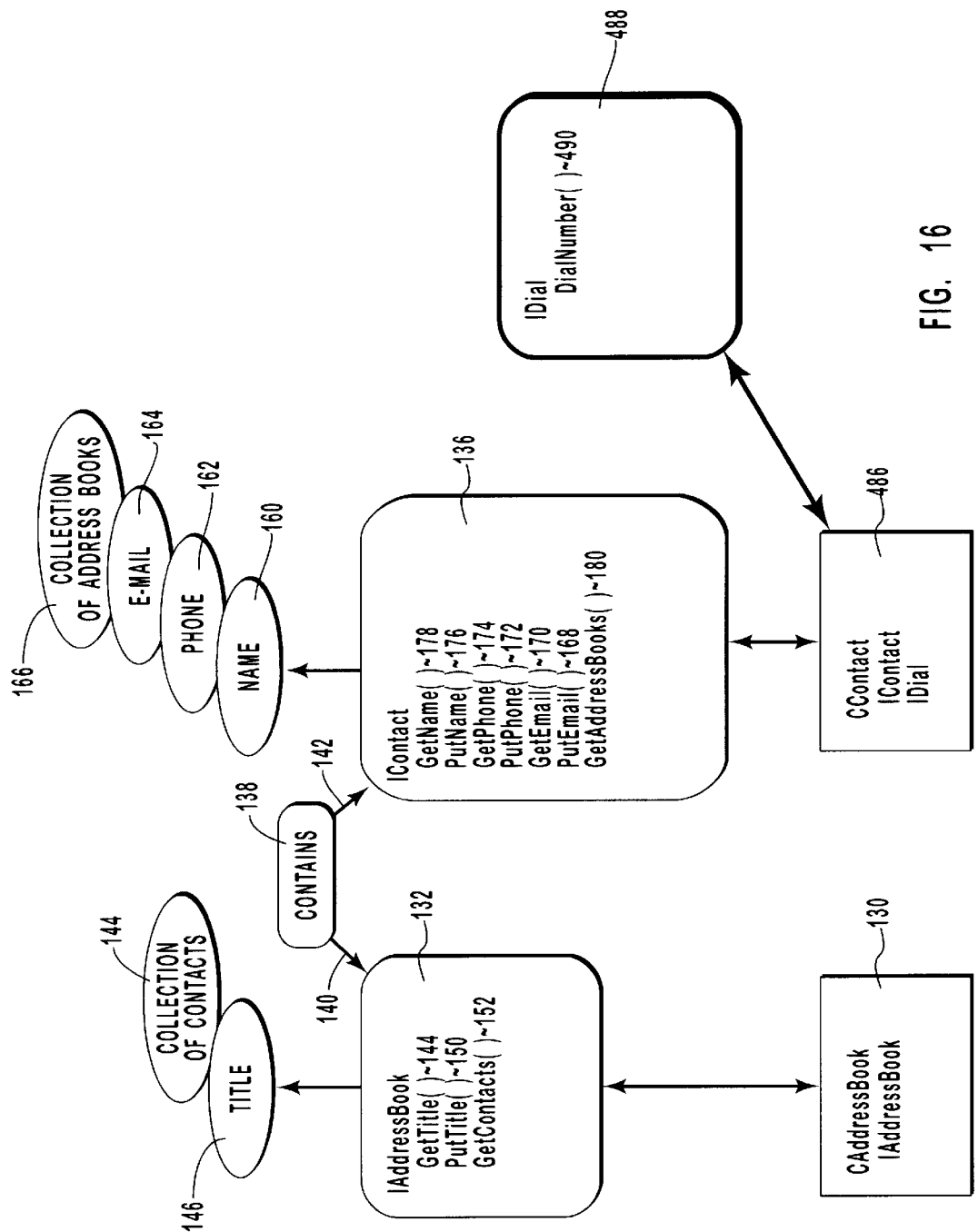
FIG. 16 shows a new logical object model for the address book example that changes the logical object model of FIG. 4 by adding a new interface that will support a method for dialing a phone number.

In order to show an example of extension, FIG. 16 shows the address book example as initially shown in FIG. 4 except the contact class includes a second interface, IDial, with a new method DialNumber. In FIG. 4, the contact class 134 supported only the IContact interface 136 while the contact class 486 of FIG. 16 supports both the IContact interface 136 and the IDial interface 488. The DialNumber method 490 of the IDial interface 488 will access the phone property 162 of the IContact interface 136 and dial the number.

Figure 17:
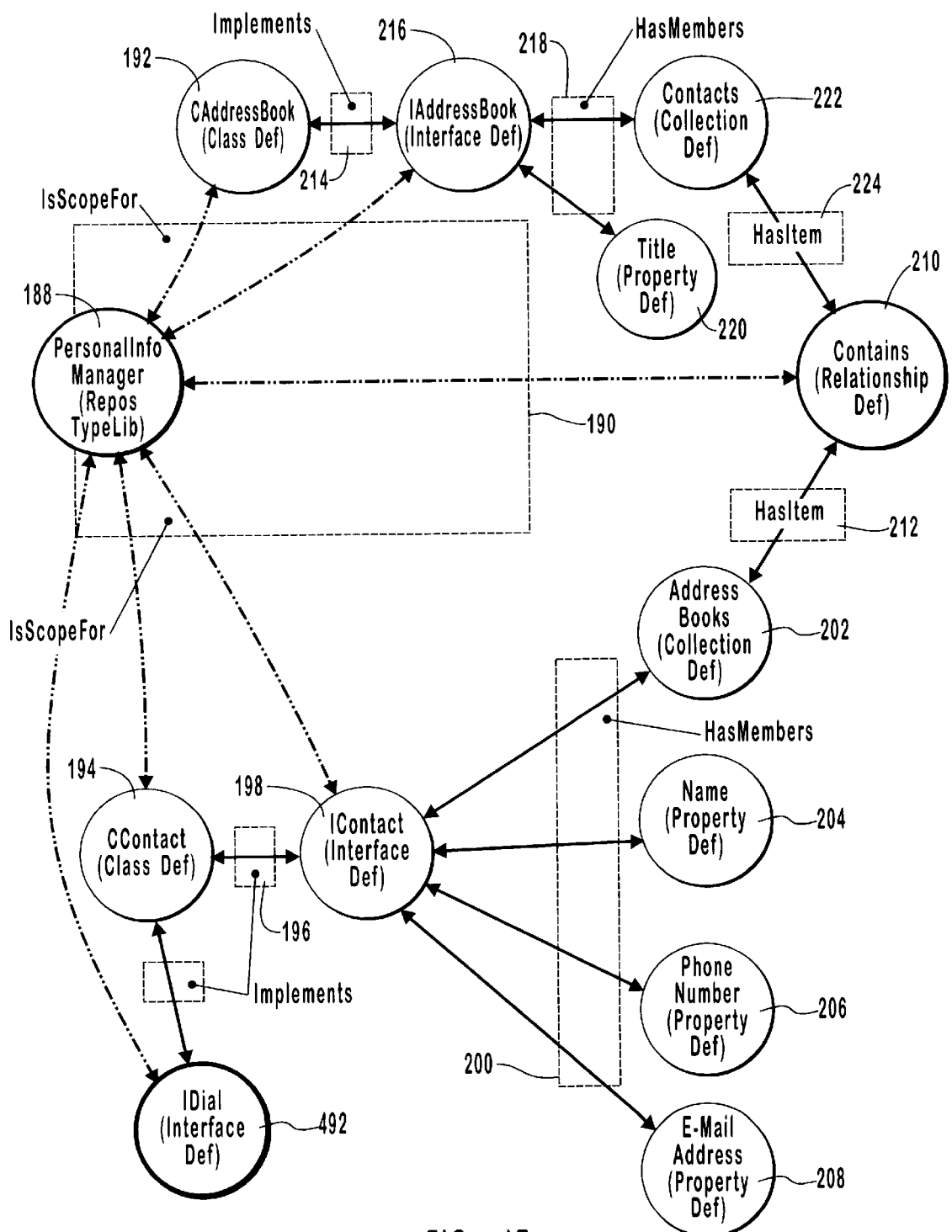
FIG. 17 shows a new type information object hierarchy to add the new interface for supporting the method to dial a particular phone number as it changes the existing type information object hierarchy shown in FIG. 5.
Figure 18:
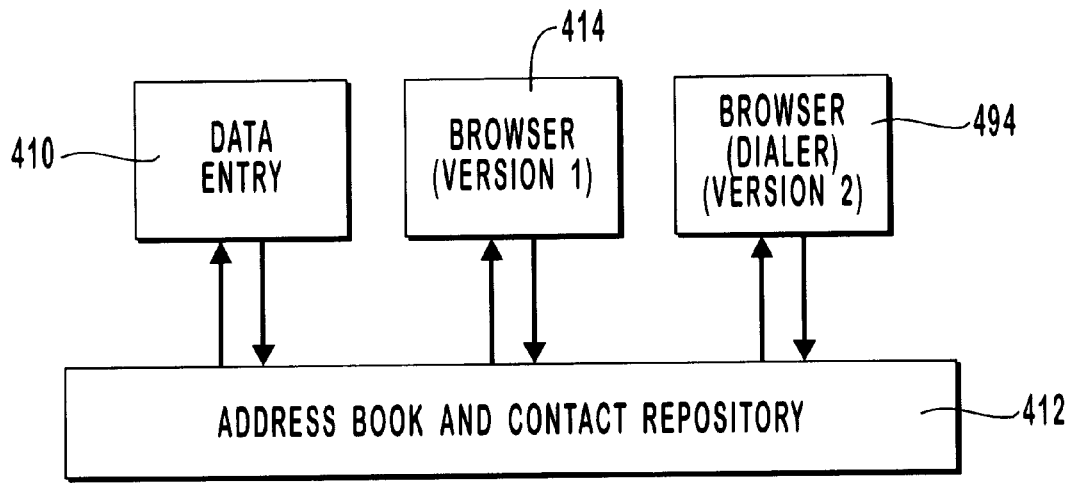
FIG. 18 is a logical diagram showing the addition of a third application, a browser with dialing capability or version two of a browser, that will also interact with the address book and contact repository as it changes the logical diagram of FIG. 13.

FIG. 17 shows the changes to the type definition object hierarchy that occurs by adding the new interface definition object 492 representing the IDial interface. Note also that there will be an additional IsScopeFor relationship 190 from PersonalInfoManager 188 to IDial 492 and Implements relationship 196 from CContact 194 to IDial 492. Finally, FIG. 18 shows the addition of another browser (version 2) 494 that implements the dialer interface and accesses the address book and contact repository 412.

Figure 19:
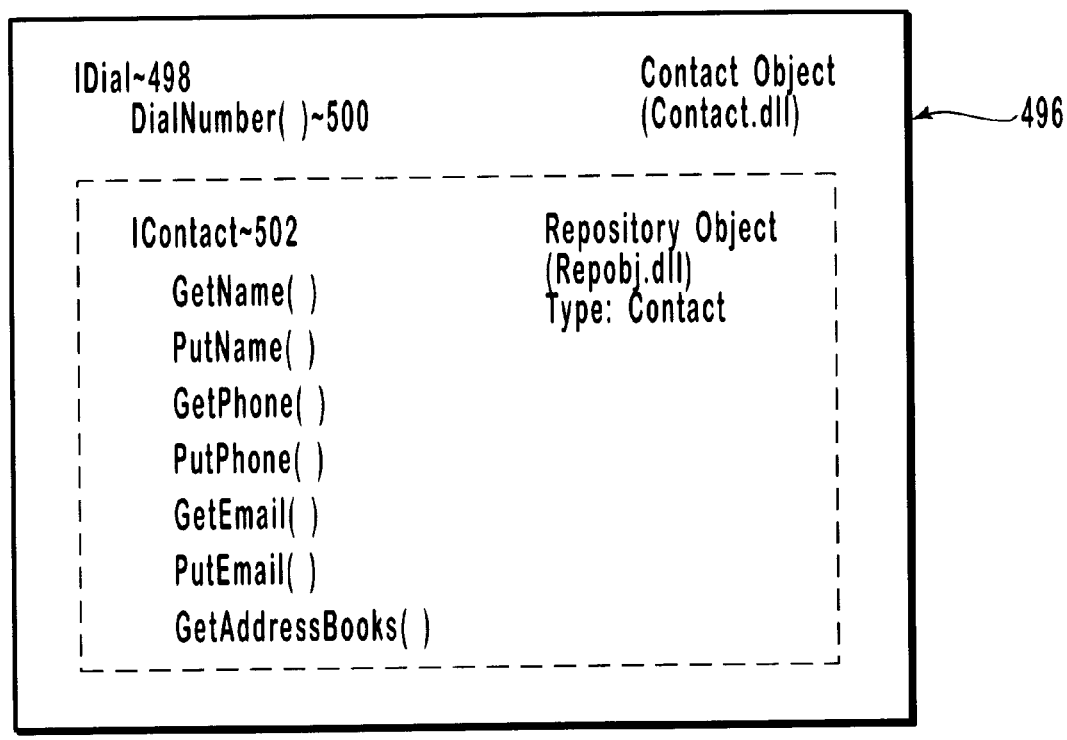
FIG. 19 is a logical diagram illustrating the extension of a generic repository object (emulating a contact object) to be wrapped with a contact object having its own code implementation and support all the related functionality of the different interfaces.

FIG. 19 is a diagram showing the custom object created by wrapping a generic repository object of type contact. The repository object supports the IContact interface 502 and the new contact object supports a new interface, IDial 498. The COM object shown in FIG. 19 contains the outer contact object 496 that is instantiated using a DLL server called "Contact.dll." The software in contact DLL allows the instantiated object to support the IDial interface 498 with the DialNumber method 500. Using COM aggregation, the IContact interface 502 and all its associated methods supported by a generic repository object of type contact are made available to outside clients using the COM binary convention. The COM server for the repository object is called "repobj.dll." By using COM aggregation, the IContact interface 502 is directly available or passed through the contact object to be made available to a client. Alternatively, a COM containment wrapping could occur which would require the contact object to access the IContact interface in order to support whatever functionality the contact object may support through the IDial interface or other interfaces.

Because type information has been entered into the repository type definition model for the interface IDial, should there be any properties associated therewith, they, too, would be stored into the SQL database.

The object state repository as described for the currently preferred embodiment may be created by a computer program product directing and controlling a general purpose computer. The computer program product will consist of some medium such as magnetic disks or CD-ROM having computer readable program code means to configure the computer. The program code means will configure or cause the computer to make the object state repository as described as well as the objects themselves. Furthermore, the program code means implementing the present invention will interact with existing program code means and additional program code means as a client in order to fully implement the configuration of the general purpose computer.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by united states letters patent is:

1. A method of storing the state of a plurality of objects and for permitting retrieval of the stored state for use in later created objects that is independently of any underlying language used to form the objects, said method comprising the steps of:

forming one or more interfaces, each interface having:
one or more properties that are capable of describing the state of an object;
one or more methods encoded in executable instructions for accessing and modifying the properties; and
one or more interface identifiers that uniquely identify the interface so as to enable access to the one or more methods;

creating an object that has an object identifier and is accessible through at least one of the one or more interfaces; and in an object state data structure, storing for the object:
the object identifier;
the one or more properties associated with each interface through which the object is accessible, so as to describe the state of the object; and
the one or more interface identifiers associated with each interface through which the object is accessible, thereby enabling the state of the object to be retrieved from the object state data structure for use in a later created object, and thereafter enabling further use of the later created object in the state described by the properties.

2. A method as defined in claim 1, further comprising the steps of:

creating the later created object;

retrieving the state of the object from the object state data structure; and assigning the state of the object to the later created object.

3. A method as defined in claim 2, wherein the object is created using a first language and the later created object is created using a second language, the step of retrieving the state of the object being conducted independently of the first language and the second language.

4. A method as defined in claim 2, wherein the step of retrieving the state of the object is conducted implicitly during object navigation.

5. A method as defined in claim 2, wherein the step of retrieving the state of the object is conducted explicitly by reference to a state identifier included in the object state data structure, the value of the state identifier corresponding to the state of the object.

6. A method as defined in claim 1, wherein the step of creating the object comprises the step of establishing a class of the object.

7. A method as defined in claim 1, wherein the properties comprise relationships implemented as a collection of relationship objects between an origin interface and a destination interface.

8. A method as defined in claim 1, wherein the properties comprise relationships implemented as a collection of target objects.

9. In a computer system, a method for preserving the state of an object for later use in another object, comprising the steps of:

creating a first object that is accessible through a given interface and that has a state defined by one or more properties associated with the given interface;

storing the properties in an object state data structure, so as to define the state of the first object;

discontinuing the first object, while preserving the properties in the object state data structure; and creating a second object and assigning the state of the first object thereto by applying the properties to the second object independently of any underlying language used to form the first object and the second object.

10. A method as defined in claim 9, further comprising the step of forming one or more interfaces including the given interface, wherein each of the one or more interfaces includes:

at least one property that is capable of describing the state of objects created in the computer system, wherein the at least one property included in the given interface includes said one or more properties;

one or more methods encoded in executable instructions for accessing and modifying the at least one property; and an interface identifier that uniquely identifies the interface so as to enable access to the one or more methods.

11. A method as defined in claim 10, wherein the step of storing the properties in an object state repository comprises the steps of:

storing in the object state data structure an object identifier associated with the object; and storing the interface identifier in the object state data structure.

12. A method as defined in claim 9, further comprising the step of establishing a plurality of classes at the computer system, the first object and the second objects being instances of the same class.

13. A method as defined in claim 9, further comprising the step of establishing a plurality of classes at the computer system, wherein the second object is an instance of a different class than that of the first object, the second object being capable of being accessed through a different interface than the first object.

14. A method as defined in claim 9, wherein the object state data structure is contained in a repository.

15. A method as defined in claim 9, wherein the object state data structure is contained in a database.

16. A computer program product for implementing a method of storing the state of a plurality of objects, thereby permitting retrieval of the stored state for use in later created objects independently of any underlying language used to form the objects, the computer program product comprising:

a computer-readable medium carrying computer-executable instructions for implementing the method, the computer-executable instructions including:

program code means for forming one or more interfaces, each interface having:

one or more properties that are capable of describing the state of an object;

one or more methods encoded in the computer-executable instructions for accessing and modifying the properties; and one or more interface identifiers that uniquely identify the interface so as to enable access to the one or more methods;

program code means for creating an object that has an object identifier and is accessible through at least one of the one or more interfaces; and object state program code means for storing for the object:

the object identifier;

the one or more properties associated with each interface through which the object is accessible, so as to describe the state of the object; and the one or more interface identifiers associated with each interface through which the object is accessible, thereby enabling the state of the object to be retrieved for use in a later created object, and thereafter enabling further use of the later created object in the state described by the properties.

17. A computer program product as defined in claim 16, wherein the object state program code means further function to store a state identifier for the object, the value of the state identifier corresponding to the state of the object.

18. A computer program product as defined in claim 16, wherein the computer-executable instructions further include:

program code means for creating the later created object;

program code means for retrieving the state of the object from the object state program code means; and program code means for assigning the state of the object to the later created object.

19. A computer program product as defined in claim 18, wherein the object is created using a first language and the later created object is created using a second language, the program code means for retrieving the state of the object operating independently of the first language and the second language.

20. A computer program product as defined in claim 18, wherein the program code means for retrieving the state of the object operates implicitly during object navigation.

21. A computer program product as defined in claim 18, wherein the program code means for retrieving the state of the object operates explicitly by referring to a state identifier stored by the object state program code means, the value of the state identifier corresponding to the state of the object.

22. A computer program product as defined in claim 16, wherein the program code means for creating the object comprises program code means for establishing a class of the object.

23. A computer program product as defined in claim 16, wherein the properties comprise relationships implemented as a collection of relationship objects between an origin interface and a destination interface.

24. A computer program product as defined in claim 16, wherein the properties comprise relationships implemented as a collection of target objects.

* * * * *

UNITED STATES PATENT AND TRADEMARK OFFICE
CERTIFICATE OF CORRECTION

PATENT NO. : 6,169,993 B1
DATED : January 2, 2001
INVENTOR(S) : David R. Shutt; Steven M. Cellini It is certified that error appears in the above-identified patent and that said Letters Patent is hereby corrected as shown below:

Column 3,
Line 15, after "of" and before "those" delete [the]

Column 8,
Line 20, after "removing" and before "an" delete [a]
Line 26, after "indentify" and before "name" insert -- the --

Column 12,
Line 5, after "FIG. 3" change "are" to -- is --
Line 47, after "of an" change "IScopeFor" to -- IsScopeFor --

Column 13,
Line 46, after "for" and before "method" change "tat" to -- that --

Column 20,
Line 37, change "FIG." to -- FIGS. --
Line 37, after "12A-12C" change "is" to -- are --

Column 28,
Line 32, after "only as" change "illustrated" to -- illustrative --
Lines 37-38, change "united states letters patent" to -- United States Letters Patent --
Line 41, after "that is" change "independently" to -- independent --

Column 30,
Line 18, after "objects" change "independently" to -- independent --

Signed and Sealed this

Eighteenth Day of December, 2001

*Attest:*

*Attesting Officer*

JAMES E. ROGAN
*Director of the United States Patent and Trademark Office*